United States Patent

Johnson

(10) Patent No.: US 6,615,213 B1
(45) Date of Patent: Sep. 2, 2003

(54) SYSTEM AND METHOD FOR COMMUNICATING DATA FROM A CLIENT DATA PROCESSING SYSTEM USER TO A REMOTE DATA PROCESSING SYSTEM

(76) Inventor: William J. Johnson, 1704 Katherine Ct., Flower Mound, TX (US) 75022

( * ) Notice: Subject to any disclaimer, the term of this patent is extended or adjusted under 35 U.S.C. 154(b) by 0 days.

(21) Appl. No.: 09/518,912

(22) Filed: Mar. 3, 2000

(51) Int. Cl.[7] .............................................. G06F 17/30
(52) U.S. Cl. .............................. 707/10; 707/9; 707/104
(58) Field of Search .............................. 707/10, 9, 103, 707/104; 380/3; 709/201, 218, 220; 370/252

(56) References Cited

U.S. PATENT DOCUMENTS

| | | | | |
|---|---|---|---|---|
| 5,625,818 A | * | 4/1997 | Zarmer et al. | 707/104 |
| 5,870,385 A | * | 2/1999 | Ahmadi et al. | 370/252 |
| 5,892,825 A | * | 4/1999 | Mages et al. | 380/3 |
| 5,898,834 A | * | 4/1999 | Sharpe et al. | 709/201 |
| 5,907,704 A | * | 5/1999 | Gudmundson et al. | 395/701 |
| 5,937,164 A | * | 8/1999 | Mages et al. | 709/218 |
| 6,484,180 B1 | * | 11/2002 | Lyons et al. | 707/103 |
| 6,493,749 B2 | * | 12/2002 | Paxhia et al. | 709/220 |

* cited by examiner

*Primary Examiner*—Safet Metjahic
*Assistant Examiner*—Thuy Pardo
(74) *Attorney, Agent, or Firm*—Browning Bushman, P.C.

(57) ABSTRACT

Provided is a system and method for facilitating the providing of client data to remote data processing systems. A user of a client data processing system can automatically communicate arbitrary amounts, and types, of application independent data to a remote data processing system through a minimal user action such as a single mouse selection, or a single keypad invocation. The application independent data comprises a set of data instances, each data instance including a data item, data type, and a user assigned label. A remote application is interfaced to through a minimal action solicitation prompt having associated application data rules. Application data rules comprise a set of sought data instances, each sought data instance including a label, acceptable data type(s), seek requirements, and validity criteria. Convenient user response to the prompt automatically communicates the predefined application independent data to the remote data processing system upon matching labels of application data rules with labels of the client's application independent data. Acceptable data types, seek requirements, and validity criteria are also matched. The application independent data is reusable, of arbitrary syntax and/or semantics, and can be maintained safely. An optional reconciliation of the transmission can be accomplished before the actual transmission. Upon receipt of the application data, configured customizable actions are performed.

16 Claims, 16 Drawing Sheets

SYSTEM AND METHOD FOR COMMUNICATING DATA FROM A CLIENT DATA PROCESSING SYSTEM USER TO A REMOTE DATA PROCESSING SYSTEM

The co-pending application Serial No. 09/518,913, filed on Mar. 03, 2000 entitled "System and Method for Expedient User Input Population", now pending referenced as WJJ-00-03, and filed on the same day herewith, discloses an invention which is related to the present invention.

FIELD OF THE INVENTION

The present invention relates generally to automatically injecting (communicating) data from a client to a remote application, and more particularly to a client data processing system maintaining, and automatically injecting (communicating), predefined application independent data to a remote data processing system.

BACKGROUND OF THE INVENTION

The growth of the internet for commerce is quickly growing. Many web sites exist wherein a user of a web browser can navigate web pages of the web site to find products of interest. When the user determines products for purchase, the web site provides an interface for the user to provide information needed to accomplish the sale and delivery of the products(s). The information includes name, credit card, and delivery address. The user enters this information into the web site interface when ordering the product(s). Various technologies and methods exist for protecting the information from unauthorized use or access during transmission. If the user wants to purchase other products at other web sites, the same information must be burdensomely re-entered into the different web server interfaces. Re-entering the same information takes time, and becomes cumbersome when ordering products from many web sites.

One solution to this problem has been for the web site server to maintain information about the customers who have previously ordered from the site. For example, Amazon.com permits a profile to be saved for the user who orders from the Amazon.com site. This allows future orders by the user to be made without re-entering the same information again. A "cookie" saved at the user's system from the last access to the web site provides a unique identifier to the user's saved profile information. While this feature serves well for subsequent orders from the Amazon.com web site, it does not solve the problem of entering in the same data to other web sites. Furthermore, it may be a concern for the user that this information is obviously maintained by a company that may not safeguard the information in a desirable manner.

Microsoft Corporation made another solution to this problem. Microsoft provides a Microsoft Wallet interface in their Internet Explorer web browser. (Microsoft is a trademark of Microsoft Corp.) The Microsoft Wallet interface permits purchasing information to be maintained by the web browser at the user's machine (i.e. user's client). Web sites must be Microsoft Wallet enabled in order for the information to be used. Only the information that the Microsoft Wallet application requests is maintained by the interface. The data collected by the interface is specifically for making purchases, is directed by the purchasing application, and is application assigned. Another problem with this approach is that the client side (user's system) and the server side are developed to pre-agreed data and the data types, thereby making the solution a poorly extendable platform for use with other data and/or other applications. Also, the Microsoft Wallet method sends purchasing data to a web site that is required to incorporate a Microsoft Wallet implementation. An open systems method is more desirable without dependency on a particular vendor, or on particular data to communicate between a client and a server. A method that does not embed data of the client/server negotiation into the developed logic is also desired.

There is a variety of other web sites that prompt users for information that is not purchase related. Company web sites provide interfaces for a user to provide resume information. Singles sites provide interfaces for a user to provide personal information. There are certainly web sites that exist where a user can manually enter all kinds of information. A method is needed for facilitating the providing of arbitrary user data to any, or all, of these web sites (i.e. application servers) without burdening the user of data re-entry. Preferably, the method should not assume anything about the syntax, or semantics, of the data provided to, or sought by, a particular web site.

Internet protocol phones (ip phones) are soon to replace the conventional circuit based telecommunication network system telephones. These telephones are becoming web clients. Automated telephone systems, such as a conventional Automated Response Unit (ARU), are being designed like a web server. Protocols between the ip phone and ARU will be similar, if not identical, to that which is between web clients and web servers today. In fact, internet protocol telephony (ip telephony) standards undergoing explosive growth are Session Initiation Protocol (SIP) and H.323. These protocols define call processing between telephone devices over an Internet Protocol (IP) network using conventional internet, network, and/or client/server methodologies. It is evident that telephones, desktop computers, and other intelligent devices will be able to talk with each other over the World Wide Web (WWW), and applications will be developed for enabling data communications between the systems. A method is needed for facilitating the providing of arbitrary user data to automated systems, ARUs, or the like, without burdening the caller from performing conventional telephone input to the ARUs. There is no reason to require a telephone user to use conventional telephone input such as voice, or keypad invocations, to a tree menu prompt interface. Multiple sessions can be accomplished between the ip telephone and other systems, or the same system, simultaneously. Also, the method should not assume anything about the syntax, or semantics, of the data provided to, or sought by, a particular automated system accessed by the ip telephone. Automated purchases via the ip telephone are only one example of use.

There are also wireless environments emerging where wireless phones have internet connectivity. The time is approaching where many varieties of handheld wireless devices (also infrared transmitting devices) will need means for defining data once for convenient re-communication to a plurality of entities, servers, or other clients. It is conceivable that there may be no electronic mail methodology desirable, if available, for the communication. A generic method is needed for facilitating the providing of arbitrary user data to any, or all, of the entities that such a device will want to communicate with, while allowing data to be defined once for re-transmission to a variety of remote applications. Preferably, the method should not assume anything about the syntax or semantics of the data provided to, or sought by, a particular entity.

SUMMARY OF THE INVENTION

The present invention enables a user of a client data processing system to automatically communicate (transmit)

arbitrary amounts, and types, of application independent data to a remote data processing system through a minimal user action such as a single mouse selection, or a single keypad invocation. Client data processing system data comprises a set of data instances, each data instance including a data item, data type, and a user assigned label. The remote data processing system is interfaced through a minimal action solicitation prompt having associated application data rules (ADRs). ADRs comprise a set of sought data instances, each sought data instance including a label, acceptable data type(s), seek requirements, and validity criteria. Convenient user response to the prompt automatically communicates (transmits) the predefined application independent data to the remote data processing system for, or upon, matching labels of ADRs with labels of the application independent data. Acceptable data types, seek requirements, and validity criteria are also matched. The client's data is reusable and can be maintained safely. The user defines a set of data once for automatically communicating (transmitting) to as many remote data processing systems as desired through the minimal user action. The user can also define a large superset of data wherein arbitrary subsets of the data may be sought by many various remote data processing systems. Upon responding to a minimal action solicitation prompt of the remote data processing system, a sought subset from the superset can be automatically communicated (transmitted) to the remote data processing system. An optional reconciliation of the transmission can be accomplished before transmission. The data can be of arbitrary syntax, or semantics, without causing redevelopment of the cooperating components of the client data processing system and the particular remote data processing system. Upon receipt of the client's data to the remote data processing system, configurable customizable actions are performed.

It is one advantage of the present invention in enabling a user to define arbitrary amounts, and types, of data one time for automatic, and repeated, transmission to remote data processing systems.

It is another advantage of the present invention in enabling the communication of data from a client data processing system to a remote data processing system without burdening the user with time to enter, or re-enter, data to the interface of the remote data processing system.

Another advantage of the present invention is in defining a generic foundation for facilitating the communication of data by clients to arbitrary remote applications. The foundation is generic in supporting any requirements of future remote applications, as well as current various remote applications. Data communicated can be of arbitrary syntax and semantics.

Yet another advantage of the present invention is in permitting the safeguarding of the data at the client data processing system.

Yet another advantage of the present invention is in enabling a user for organizing sets of data for automatic transmission, as well as manage the sets of data for convenient activation when desired.

Another advantage of the present invention is in providing a better method over cutting and pasting data into an application of a remote data processing system, and/or re-entering the same previously entered data. Expedient client interaction to a remote data processing system is facilitated.

A further advantage of the present invention is to provide a system arid method for communicating data to an arbitrary remote data processing system device while preserving the capability for supporting an arbitrary type of application at the remote data processing system device.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein.

DETAILED DESCRIPTION OF THE PREFERRED EMBODIMENTS

Figure 1:
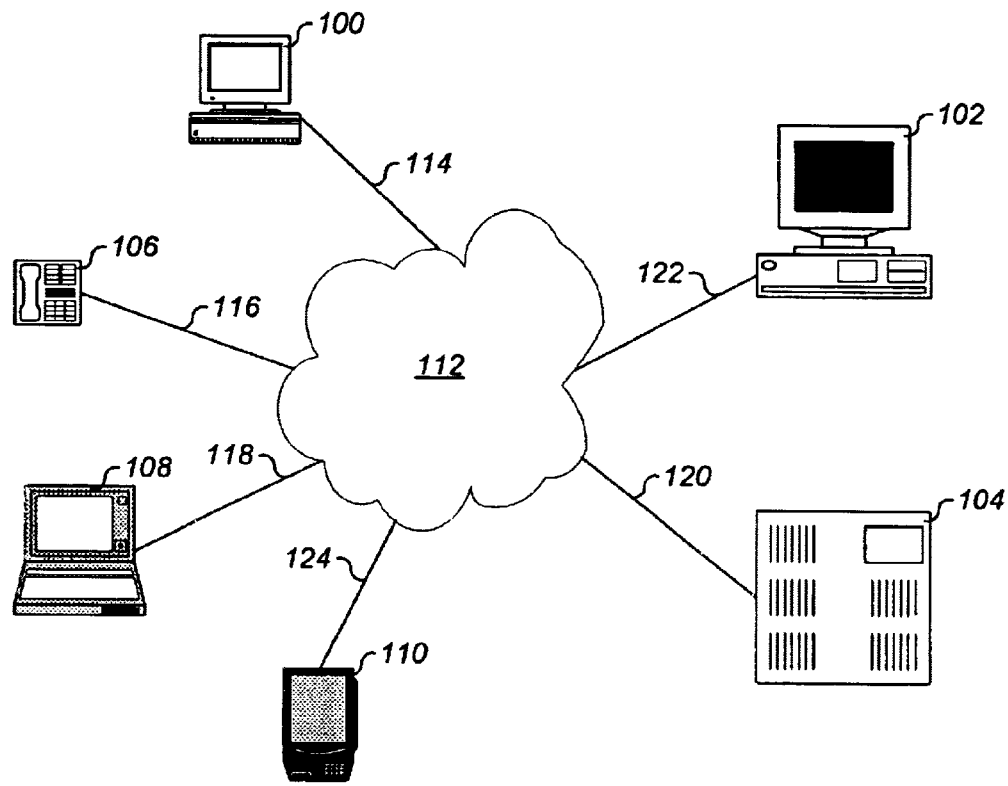
FIG. 1 depicts a generic network illustration for discussing the various embodiments of the present invention.

FIG. 1 depicts a generic network illustration for discussing the various embodiments of the present invention. Personal computer 100, server computer 102, telephone system controller 104, telephone 106, laptop computer 108, and Personal Digital Assistant (PDA) device 110 are each data processing systems with some application executing thereon. The data processing systems may depend on a communications network 112 for communicating data from one system to the other. Depending on the embodiment of the present invention, communications network 112, as depicted, may be a copper wire network, fiber optic network, wireless network, infrared wireless proximity, combinations thereof, or the like.

In one embodiment, personal computer 100 is a client data processing system connected over a communications connection 114, such as a copper wire connection, fiber optic connection, or the like, to the server computer 102 over a similar communications connection 122. The server computer 102 is a remote data processing system to the client data processing system because communications of data requires leaving one system and arriving to the other. A web site, or other server application, may execute at server computer 102 for allowing a user of a browser application at personal computer 100 to interface to the web site.

In another embodiment, telephone 106 is an ip telephone, and a client data processing system, connected over a communications connection 116, such as a copper wire connection, fiber optic connection, or the like, to the telephone system controller 104 over a communications connection 120. Telephone system controller 104 may be an ip telephone network call manager, an ARU, a telephone switch, or any other data processing system entity. The telephone system controller 104 is a remote data processing system to the client data processing system because the client data processing system communications of data requires leaving one system and arriving to the other. A telephone interface type of application may execute at telephone system controller 104 for allowing a user of the ip telephone to interface to an application accessed by the telephone system controller 104.

In another embodiment, telephone 106 is a wireless telephone, and a client data processing system, communicating over a communications connection 116, such as a wireless connection, or the like, to the telephone system controller 104 over a communications connection 120. Telephone system controller 104 may be a wireless systems controller, network call manager, an ARU, a telephone switch, or any other data processing system entity. The telephone system controller 104 is a remote data processing system to the client data processing system because the client data processing system communications of data requires leaving one system and arriving to the other. A telephone interface type of application may execute at telephone system controller 104 for allowing a user of the wireless telephone to interface to an application accessed by the telephone system controller 104.

In yet another embodiment, laptop computer 108 is a client data processing system communicating over a communications connection 118, such as a wireless connection, or the like, to the server computer 102 over a communications connection 122. The server computer 102 is a remote data processing system to the client data processing system. A web site, or other server application, may execute at server computer 102 for allowing a user of a data processing system application at laptop computer 108 to interface to the remote data processing system application.

In still another embodiment, PDA 110 is a client data processing system communicating over a communications connection 124, such as a wireless connection, infrared proximity, or the like, to the server computer 102 over a communications connection 122. The server computer 102 is a remote data processing system to the client data processing system. A server application may execute at server computer 102 for allowing a user of a data processing system application at PDA 110 to interface to the remote data processing system application.

In yet a further embodiment, any other aforementioned client data processing systems may also communicate to like data processing systems, or any other client data processing systems, by way of a communications network 112 as described, and as is well known in the art. Depending on the point of view of a user, a client data processing system is connected to a remote data processing system wherein the remote data processing system may be a server data processing system, or another client data processing system.

Figure 2:
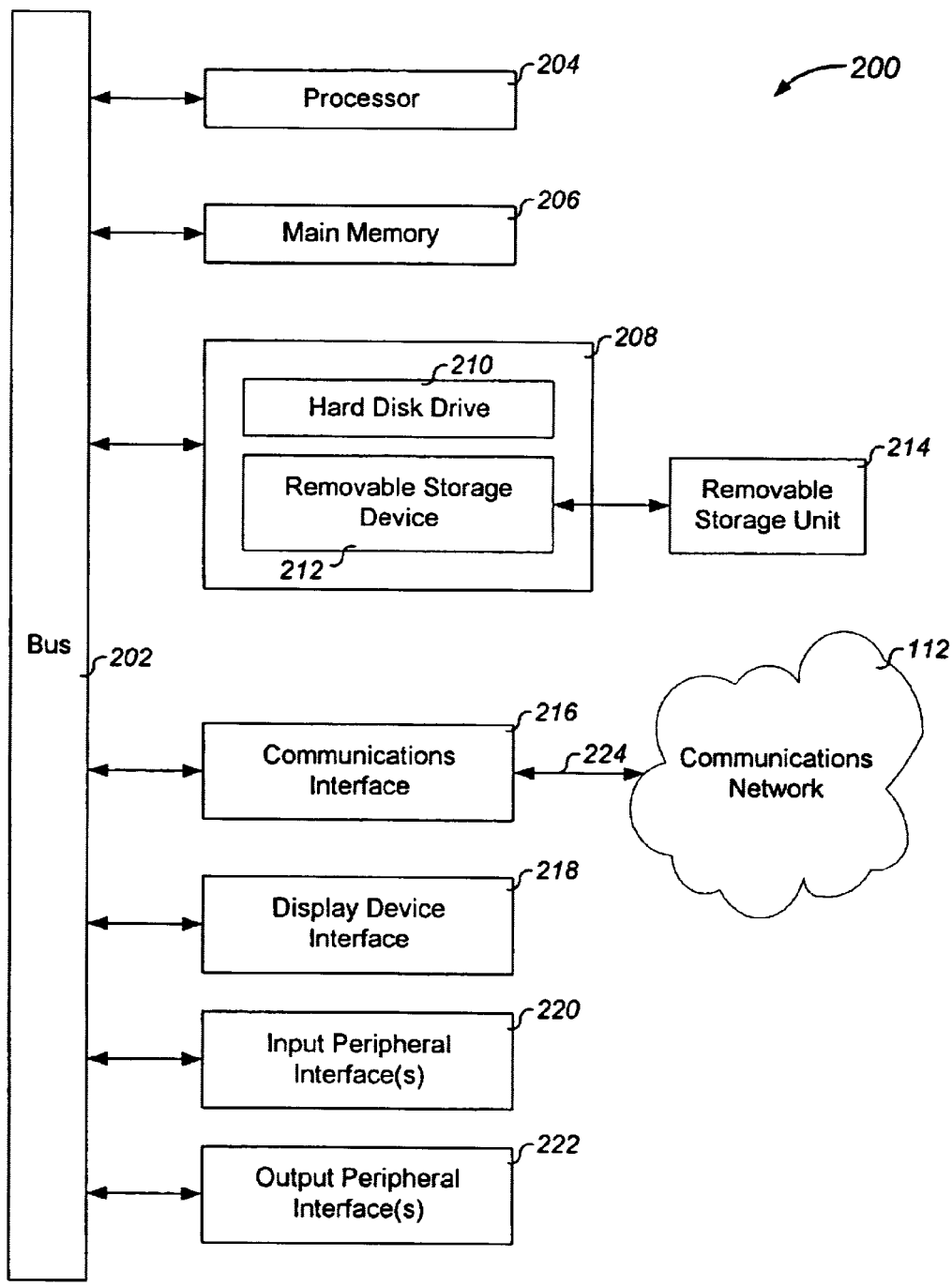
FIG. 2 depicts a block diagram of a minimal data processing system useful for implementing client data processing system aspects of the present invention, and remote data processing system aspects of the present invention.

FIG. 2 depicts a block diagram of a minimal data processing system useful for implementing client data processing system aspects of the present invention, and remote data processing system aspects of the present invention. A data processing system 200 according to the present invention includes at least one processor 204 coupled to a bus 202. The data processing system 200 also includes main memory 206, for example, random access memory (RAM). Optionally, the data processing system 200 may include secondary storage devices 208 such as a hard disk drive 210, and/or removable storage device 212 such as a compact disk, floppy diskette, or the like, also connected to bus 202. In one embodiment, secondary storage devices could be remote to the data processing system 200 and coupled through an appropriate communications interface.

The data processing system 200 may also include a display device interface 218 for driving a connected display device (not shown). The data processing system 200 may further include one or more input peripheral interface(s) 220 to input devices such as a keyboard, telephone keypad, Personal Digital Assistant (PDA) writing implements, mouse, voice interface, or the like. User actions to the data processing system are inputs accepted by the input peripheral interface(s) 220. The data processing system 200 may still further include one or more output peripheral interface(s) 222 to output devices such as a printer, facsimile device, or the like.

Data processing system 200 will include a communications interface 216 for connecting data processing system 200 to an other data processing system via communications network 112 over a communications connection 224 managed over analog signal waves, digital signal waves, copper wire, optical fiber, or the like.

Data processing system programs (also called control logic) may be completely inherent in the processor 204 being a customized semiconductor, or may be stored in main memory 206 for execution by processor 204 as the result of a read-only memory (ROM) load (not shown), or may be loaded from a secondary storage device into main memory 206 for execution by processor 204. Such programs, when executed, enable the data processing system 200 to perform features of the present invention as discussed herein. Accordingly, such data processing system programs represent controllers of the data processing system.

In one embodiment, the invention is directed to a control logic program product comprising a processor 204 readable medium having control logic (software) stored therein. The control logic, when executed by processor 204, causes the processor 204 to perform functions of the invention as described herein.

In another embodiment, the invention is implemented primarily in hardware, for example, using a prefabricated component state machine (or multiple state machines) in a semiconductor element such as processor 204.

Those skilled in the art will appreciate various modifications to the data processing system 200 without departing from the spirit and scope of the invention. Data processing system 200, as discussed, is representative of a client data processing system of the present invention. Data processing system 200, as discussed, is representative of a remote data processing system of the present invention.

Figure 3:
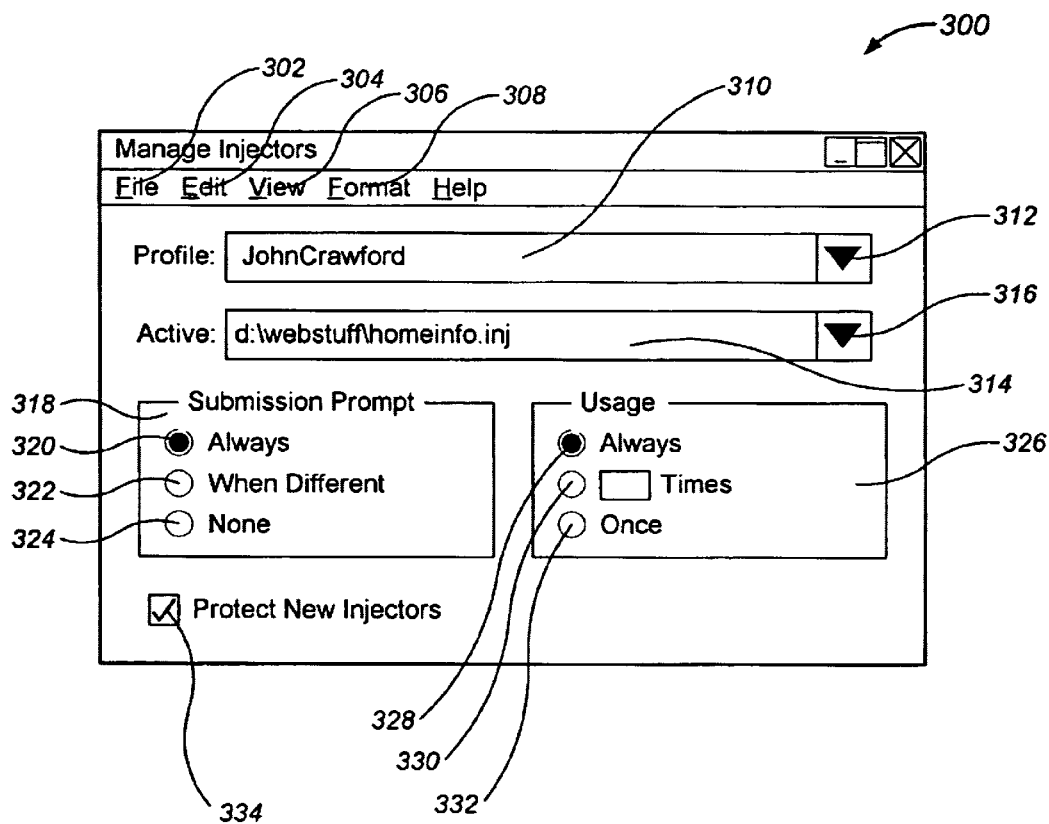
FIG. 3 depicts a preferred embodiment of a manage injectors window in a windowed data processing system embodiment of the present invention.
Figure 4:
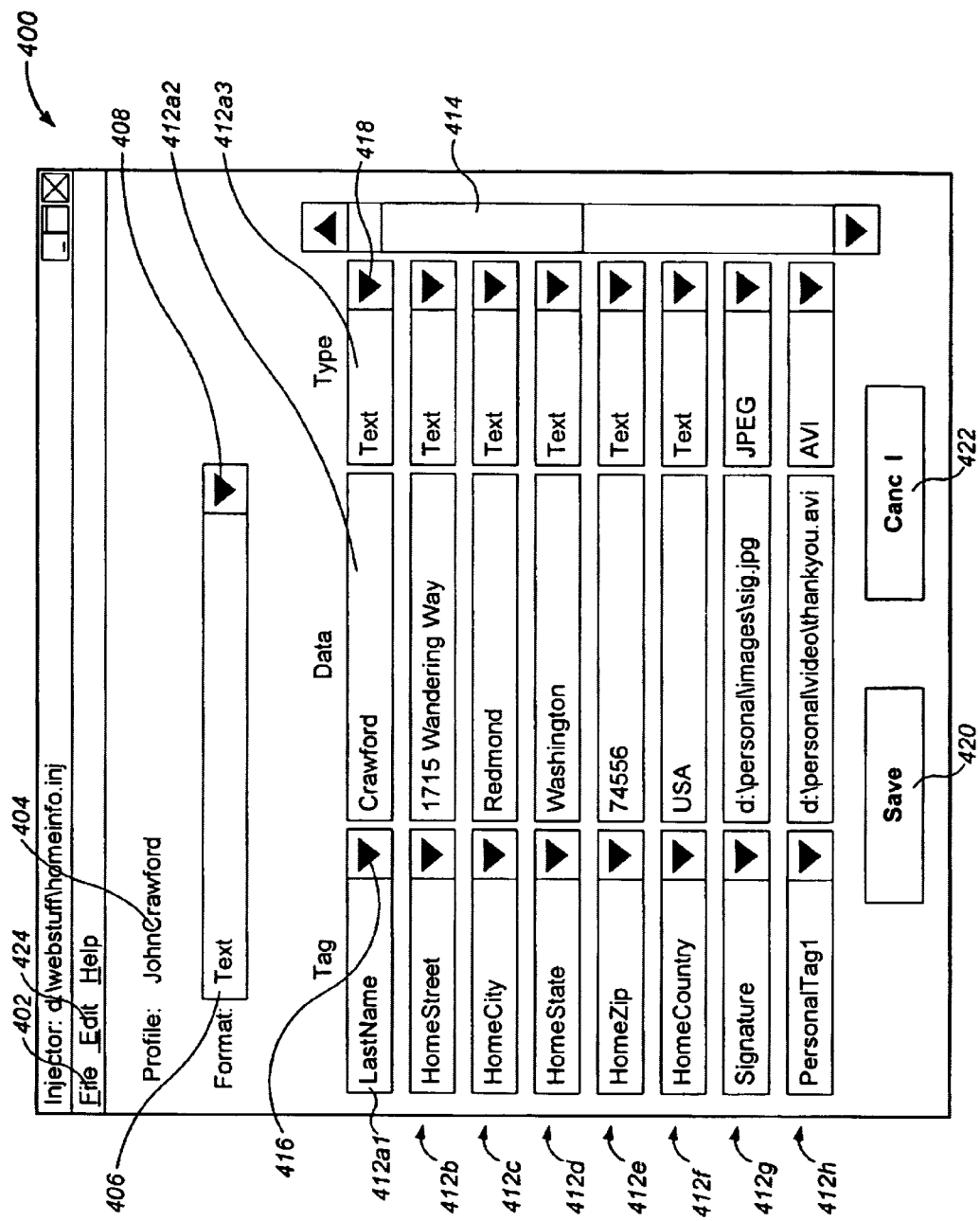
FIG. 4 depicts a preferred embodiment of an edit injector window in a windowed data processing system embodiment of the present invention.
Figure 5:
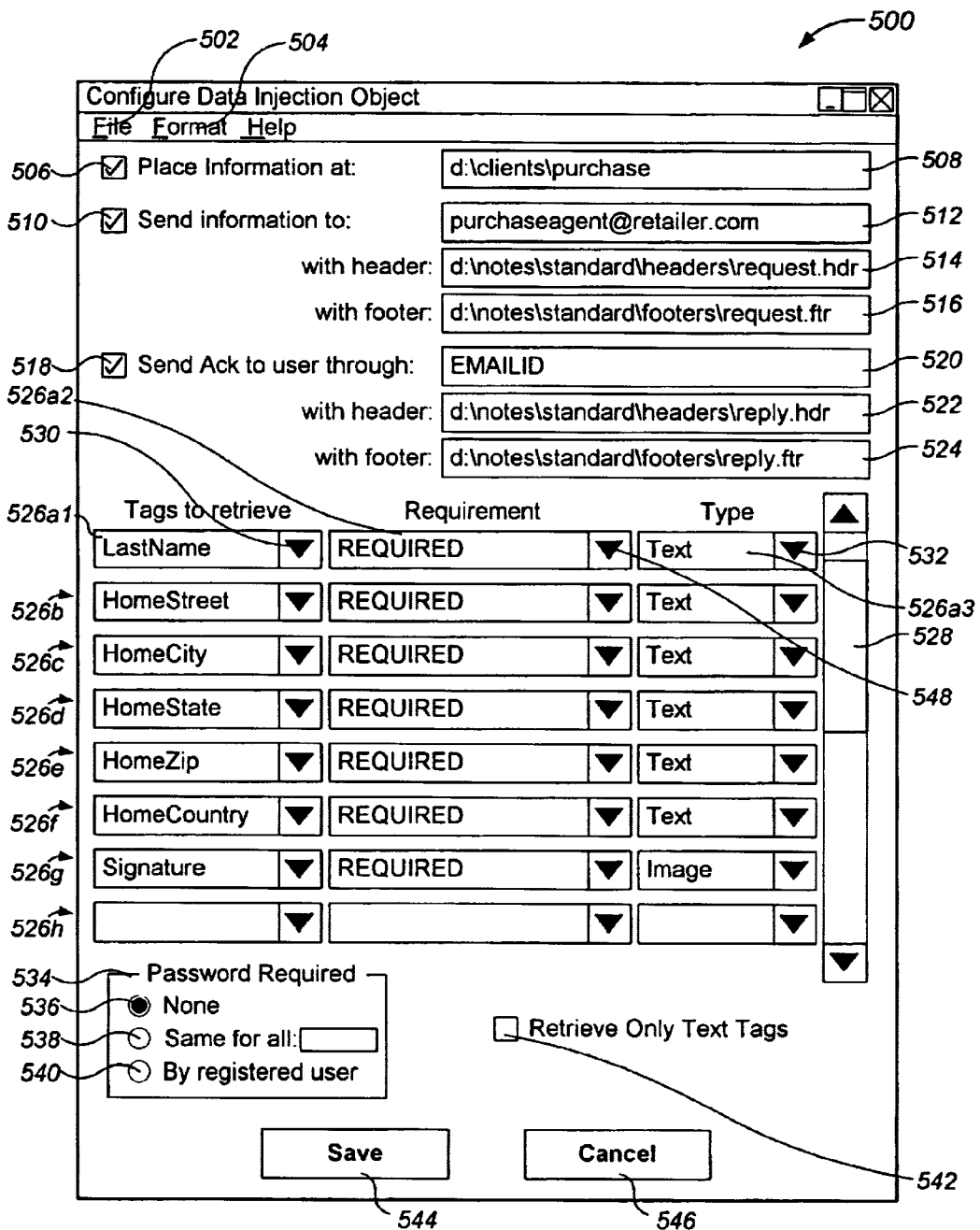
FIG. 5 depicts a preferred embodiment of a configure data injection object window in a windowed data processing system embodiment of the present invention.

FIG. 3 depicts a preferred embodiment of a manage injectors window in a windowed data processing system embodiment of the present invention. FIGS. 3, 4, and 5 are provided to facilitate the reader's understanding of the invention, and not meant to limit the scope of the invention. A client data processing system such as the telephone 106, or PDA 110, may not have a windowed data processing system. However, data will be maintained by a suitable interface in a similar manner, as described by the flowcharts. Alternatively, the result of user interface to FIGS. 3, 4, and 5 may be embodied in a flat text file form maintained by a text file editor. The text file may take on a variety of formats, provided there is no ambiguity or loss of information stored therein. The flat text file may also be a hypertext markup language (html) file with defined html tags and html attributes that store the information appropriately.

A manage injectors window 300 provides one embodiment for maintaining client data processing system data according to the present invention. An injector is a set of application independent data. An injector is a set of data instances. When an injector is communicated to a remote data processing system, it is said to be injected to that system. The injector is injected data to the remote data processing system. Manage injectors window 300 includes a File pulldown option 302 which contains a selectable text list of "New Profile" for creating a new profile, "New Injector" for creating a new injector, "Open" for opening an existing injector for edit, and "Exit" for exiting the manage injectors window 300. Pulldowns are as is conventional in a windowed system. Edit pulldown option 304 contains a selectable text list of "Active Injector" for editing the injector currently displayed in the profile entry field 310 and active injector entry field 314 of manage injectors window 300, and "Tags" for editing the supported list of tags. View pulldown option 306 contains a selectable text list of "Profiles" for querying profiles of the user of the client data processing system, "Injectors" for querying injectors maintained by the user of the client data processing system, "Hot Keys" for querying hot key (i.e. fast-path) assignments to injectors, "Tags" for querying all tags currently defined to the system, "Types" for querying all supported types of the system, and "Formats" for querying supported formats of injectors of the system. Format pulldown 308 contains a single text option of "Active Injector" for formatting the injector currently displayed in the profile entry field 310 and active injector entry field 314 of manage injectors window 300. A profile entry field 310 displays one of the profiles (or groups) that are selectable through a group list pulldown 312. An active injector entry field 314 displays one of the injectors that are selectable through an injector list pulldown 316. A displayed injector of entry fields 312 and 314 is said to be currently active in the system. The active injector is that injector which is ready (loaded) for communicating to a remote data processing system. The active injector may also be set with a fast-path, for example a hot-key, at any time. A fast-path may be a voice command, key stroke(s) sequence, or any other user action for expedient setting of an active injector. The eligible injectors of the list accessed by injector list pulldown 316 are determined by being subordinate to the group currently displayed in the profile entry field 310. In one embodiment, the user identifier as authenticated (e.g. user name and password) by the client data processing system prior to access of manage injectors window 300 is used as the group name of all injectors maintained by the user. In another embodiment, a user may maintain a plurality of user named groups of injectors. Therefore, a profile can be a user authenticated profile of injectors, or a group of injectors. In any case, injectors are preferably subordinate to a profile, or group.

A submission prompt radio button group 318 includes an always prompt option 320, a when different prompt option 322, and a none prompt option 324. The always prompt option 320, when set, indicates to the system that upon user response to a minimal action selection prompt (MAST), a reconcilable indication containing a summary of how the client data processing system's active injector data mapped to the application data rules (ADRs) of the remote data processing system should always be provided to the user for reconciliation before automatically communicating the data to the remote data processing system. Injector data is referenced by a name (e.g. file name). Injector data includes being defined in terms of tags and data types. The tags are actually labels to the data instances. Incorporating tags (i.e. labels) allows the data to be application independent data to applications of various remote data processing systems. The labels (tags) provide the link when mapping the injector data of the client data processing system with the requirements of the remote data processing system. Application data rules (ADRs) are rules from the remote data processing system that define what data is sought, or accepted, by the remote data processing system. ADRs include being defined in terms of tags (i.e. labels), acceptable data types, seek requirements, and validity criteria.

The when different prompt option 322, when set, indicates to the system that upon user response to a MAST, only provide a reconcilable indication if there is a difference between ADRs and the active injector data. The none prompt 324 indicates to the system to never provide a reconcilable indication prior to transmission (provided no errors occurred).

A usage radio button group 326 includes an always use option 328, a numbered use option 330, and a one time use option 332. The always use option 328, when set, indicates to the system that the active injector should be used as many times as needed by the user to any remote data processing systems. The numbered use option 330, when set, indicates to the system to only permit a specified numbered of uses of the injector to remote data processing systems. The user specifies the number of times in the entry field (next to the option) that becomes active when the numbered use option 330 is selected. The numbered use option 330 provides an expiration of the active injector. Alternative embodiments will support other expiration types using time, events, or any other expiration predicate. There becomes no active injector in the system when the number of uses (i.e. expiration) has been met for the injector. The user will need to subsequently intervene through re-setting of an injector to active. The one time use prompt 332 indicates to the system to use the active injector one time. The system will subsequently require the user to re-activate the (, or a,) injector if desired.

A protect new injectors option 334 enables a user to protect all injectors that are newly created by the user. Protection will default the format of the injector to a safeguarded format (e.g. key encrypted) that is inaccessible by would-be attackers.

The manage injectors window 300 further includes a Help pulldown option, title bar, and other features typical of conventional windows.

FIG. 4 depicts a preferred embodiment of an edit injector window in a windowed data processing system embodiment of the present invention. An edit injector window 400 is arrived at by way of selecting to create a new injector, open an existing injector, or edit the active injector, from the manage injectors window 300. It is important to note that a client data processing system such as the telephone 106, or PDA 110, may not have a windowed data processing system. However, data will be maintained by a suitable interface in a manner as described by the flowcharts.

The manage injector window 400 is also a conventional type of window with the usual controls. The title bar preferably contains the name of the new or opened injector. A File pulldown 402 contains a selectable text list of "Use Template" for creating a new injector using an existing injector as a starting point (defaults window settings to the selected injector), "Save" for saving the currently edited injector, and "Exit" for exiting the window. An Edit pulldown 424 contains a single text option of "Hot Key" for editing the hot key used to activate the injector.

Profile field 404 displays the profile (or group) that the injector is subordinate to. A format entry field 406 allows specification on the format used to store the injector. Optional formats are available for selection by the format list pulldown 408. Formats include text, html, and various data encryption standard (DES) encodings such as 32 bit DES blob, 64 bit DES blob, Mansfield encryption, or the like. Alternative formats may also be available. The user is able to store the injector in a protected form from unauthorized access by users or processes of the client data processing system as well as users or processes of a remote data processing system.

A set of data instances 412 includes one or more data items such as the data item 412$a2$. A data instance, for example 412$d$, includes a label (tag), data item, and data type of the data item. Data item 412$a2$ has a user assigned label 412$a1$ referred to as a tag. Available labels can be selected from the tag list pulldown 416 for assigning to the data item. Labels may be standardized across communicating data processing systems, and/or may be defined as desired by a user. Each data item also has a user assigned data type such as 412$a3$, which can be selected from the type list pulldown 418. In all embodiments of the present invention, types include, and are not limited to, text (typed into data item entry field), text file (fully qualified file name typed into data item entry field), graphic files such as JPEG, GIF, TIFF, etc, audio files such as MIDI, WAV, etc, video files such as MPEG, VIVO, REAL, etc., or any other multimedia file formats. The type is validated through obvious error handling when saving the injector. In one embodiment, the number of data instances that can be defined in a set depend on the number of available labels (tags) that can be assigned. In another embodiment, a label may be used more than once, and the number of data instances is only bounded by the amount of data defined by the user for the injector. An injector includes a set of data instances 412. The current set of data instances defined can be scrolled in the usual manner and the scroll bar includes a conventional slider 414 that can be manipulated. The slider 414 depicts which section in the list is currently displayed, and relatively how many items are in the list (by slider size). In one embodiment, the edit injector window 400 automatically creates a null data instance at the bottom of all data instances so there is always a row for adding a data instance. A drag and drop technique can be used to move a data instance from one position to another. For example, data instance 412$g$ can be dragged and dropped to the position 412$h$, thereby reordering data instances.

Once the user is satisfied that the injector is ready for saving, the save button 420 can be invoked, or the save option from the File pulldown 402 can be invoked. The user may also cancel any edits, or the creation of a new injector, by selecting the cancel button 422, or selecting exit from the File pulldown 402. When save is selected, the injector is validated and saved in the specified format at the client data processing system to main memory 206, and/or secondary storage devices 208.

Depending on the embodiment, the set of data instances 412 may simply be maintained in a flat text file, html file, or other file type, by a conventional editor. No graphical user interface (GUI) may be used, or needed. In another embodiment, labels (tags) of the data instances may be database table column names accessible by standard query language (SQL) that were defined by an administrator. One can see that data instances 412 are easily maintained in a database. Labeled data in various embodiments may be very complex, lengthy, or organized parts.

FIG. 5 depicts a preferred embodiment of a configure data injection object window in a windowed data processing system embodiment of the present invention. A configure data injection object window 500 allows a user, or administrator, of a server data processing system (e.g. web server), to configure graphical embodiments of minimal action solicitation prompts according to the present invention. A minimal action solicitation prompt (MAST) in a web site embodiment may be a graphical object presented by the web site interface to remote clients. The MAST is that object which a client responds to (e.g. invoke) for automatic injection of predefined injector data to the web server from the client data processing system with minimal user action. The FIG. 5 windowed embodiment for constructing a MAST is presented to facilitate the reader's understanding. In such an embodiment, the MAST may be a well known icon, or graphic, embedded (or referenced), in html, or presented to the interface of the client data processing system by an executable executing at the client data processing system on behalf of the remote data processing system. The executable may be a Java script, Java program, or other conventional executable.

In alternative embodiments, the MAST is an audio prompt provided to the user of an ip telephone wherein a simple keypad pressed at the ip telephone automatically injects predefined injector data to the remote data processing system.

In other embodiments, the MAST is a protocol acknowledgment, protocol prompting, or protocol presentation of a selectable/invocable entity, over communications network 112 from the remote data processing system to the client data processing system.

Configure data injection object window 500 is a conventional type of window with the usual controls. A File pulldown 502 contains a selectable text list of "Save" for saving the MAST configuration, and "Exit" for exiting the window without changes. Configure data injection object window 500 is presented to the server data processing system user in association with a particular MAST of the server's interface. There may be multiple MASTs in the interface. A Format pulldown 504 provides action for specifying validity criteria of highlighted row(s) of sought data instances 526. Sought data instances are shown generally as sought data instances 526. Upon user highlight of one or more sought data instances, the Format pulldown 504, when invoked, allows the user to define special treatment or valid ranges of data items sought from, or accepted by, client data processing systems. A sought data instance can be defined in terms of numeric only, alphabetic only, alphanumeric, within a range of values, or any other constrained requirements. For example, validity criteria of five required numeric characters must be specified for data instances 526e. Labels (i.e. tags) of sought data instances from the client data processing system may be html tag names, database column names, or simply text strings, depending on the embodiment. A sought data instance includes a tag (label), acceptable data type(s) of a sought data item, seek requirements, and validity criteria. Further provided are customizable actions to be performed when a remote client data processing system responds to the MAST. Customizable actions include sending a customized email of injected data to configured address(es), storing information at destination(s), and/or sending customized acknowledgement email to the client data processing system that responded to the MAST. Storage information option 506, when selected, will place an appropriate receipt document of a client's data injection at the location specified in the storage entry field 508. Send information option 510, when selected, will send an appropriately formatted email note of a client's data injection to one or more comma separated email addresses specified in email address entry field 512. A predefined header and/or footer can be specified for the email note through send header entry field 514 and send footer entry field 516, respectively. Acknowledge information option 518, when selected, will send an appropriately formatted acknowledgement email note of the data injection back to the client who performed injection of data to the MAST as an acknowledgement. A label (tag name) from sought data instances 526 is used to contain the client's email address. A predefined header and/or footer can be specified for the email acknowledgement note through ack header entry field 522 and ack footer entry field 524, respectively.

Alternate embodiments of customizable actions include populating a database, communicating with other entities, executing one or more processes, or any other reasonable set of actions particular to the embodiment. A suitable interface is provided for configuring the various customizable actions that can be accomplished. Customizable actions may also be configured based on a particular standardized label, for example a specified process to perform upon receipt of particular label(s).

Sought data instances 526 are configured through specifying the label, whether or not it is required, the data type that is required, and any validity criteria. Some embodiments may implicitly define the type by a label name. Labels are specified via a tag list pulldown 530, or can be entered literally into the tag entry field, for example, tag entry field 526a1. Seek requirements, for example seek requirement 526a2, are specified through the seek requirement list pulldown 548. Eligible values include REQUIRED, GATHER IF AVAILABLE, and NOT REQUIRED. A NOT REQUIRED setting allows configuring a data instance having no participation in data injection (i.e. a placeholder). Types, for example 526a3, are specified with the type list pulldown 532. Eligible types include the types already discussed for FIG. 4. An alternative embodiment can specify type categories such as GRAPHIC, AUDIO, or VIDEO, thereby allowing a plurality of specific client data processing types to be valid candidates to the sought data instance. A file extension of an injected data instance, for example, may distinguish the precise type of the categorized file.

A MAST can also be defined with a protected usage option through configuring password requirements. A password requirement radio button group; 534 allows configuring no password required for client use of the MAST (no password option 536), a single password required by all clients who want to inject data to the MAST (same password option 538), or a unique password registered by a registrar accessed by the data processing system configuring the MAST (register password option 540). The register password option 540 requires a user identifier and password maintained for all clients who can potentially inject data to the MAST.

A retrieve text tag option 542 allows convenient configuration of sought data instances to be defined as seek only the textual type data instances 526.

The save button 544 can be invoked to save changes for the currently configured MAST, and the cancel button 546 can be invoked to cancel out changes since invoking the configure data injection object window 500.

In various embodiments, the MAST will be configured at the remote data processing system through definition in html used to define a client interface at the remote data processing system. Injectors maintained at the client data processing system may also be defined in an html format. As well known in the art, HTML files are defined through a common syntax for an html element:

<T1 ATTRIB="value". . . >Affected Content</T1> such that T1 is an html tag name, ATTRIB is an attribute name of the tag, value is the attribute value, affected content is the content affected by the tag, and the sequence is delimited with an end tag </T1>. There may be many attributes, and affected content may be actual content displayed to the user interface, or may be other nested html elements. A nested html syntax suitable for defining injector data, as well as MAST definitions, is easily defined (e.g. with new tag names and attributes), or standardized, so that these can be appropriately embedded in existing html. In an alternative embodiment, existing html tag names may be extended with suitable attributes. For example, a "MAST" attribute may extend the well known html "IMG" tag for defining the invocable "IMG" tagged MAST graphic as well as criteria of the MAST which was exemplary defined in an interface such as FIG. 5. In an alternative embodiment, configuration of FIG. 5 may define behavior of an executable to be executed at the client data processing system on behalf of the remote data processing system that presents the MAST to the client.

With reference now to the flowcharts, all embodiments of the present invention are described. Obvious error handling is omitted from the flowcharts in order to focus on the key aspects of the present invention.

Figure 6:
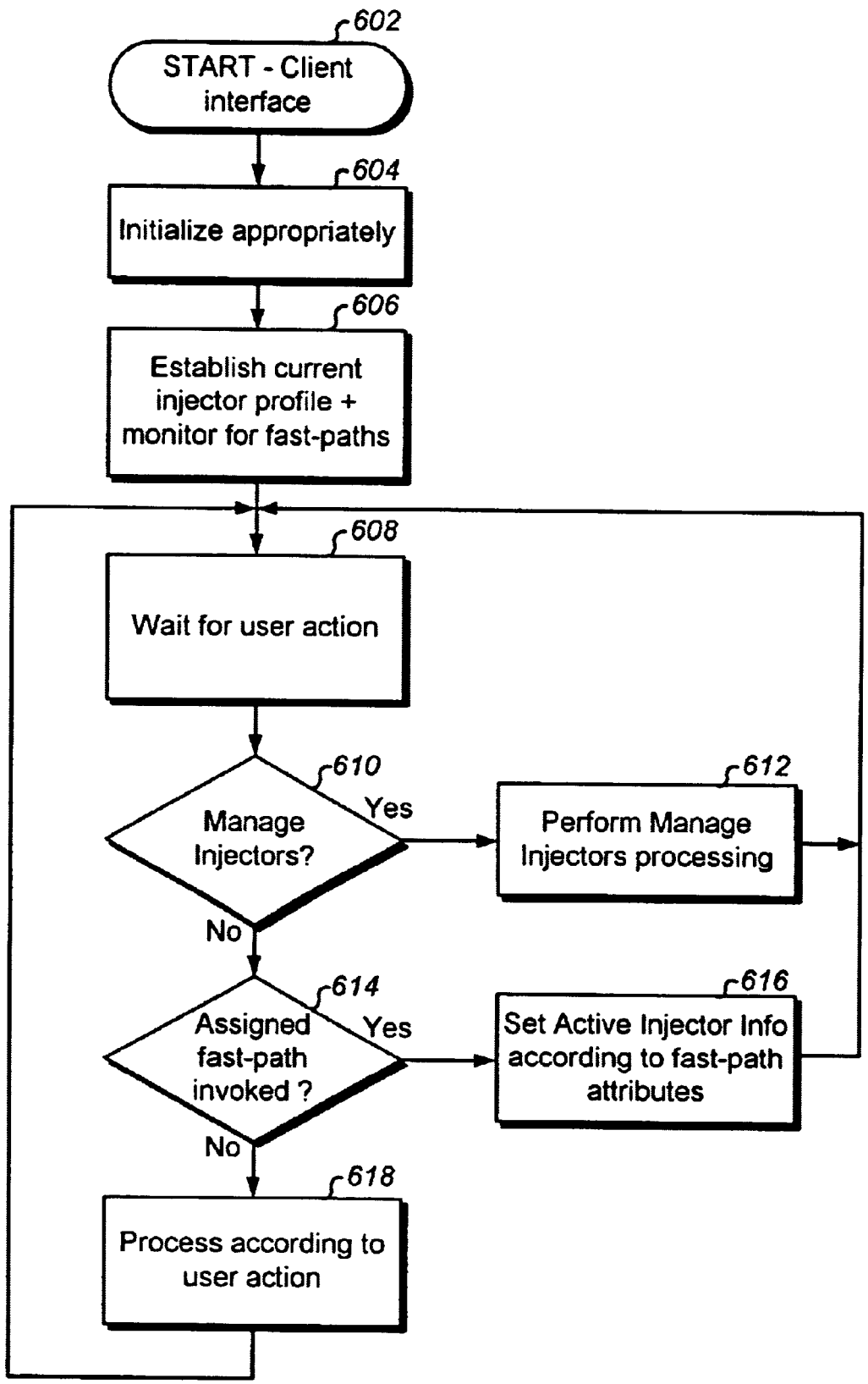
FIG. 6 depicts a flowchart for describing a preferred embodiment of the client data processing system interface aspect relevant to the present invention.

FIG. 6 depicts a flowchart for describing a preferred embodiment of the client data processing system interface aspect relevant to the present invention. In various embodiments, the interface may be visual, and/or audio, in nature. The relevant interface begins at block 602 and proceeds to block 604 where appropriate initialization occurs. Then, block 606 establishes a current injector profile and monitors for fast-paths invoked by the user of the client data processing system. The injector profile may be a user identifier of an authenticated user, or may simply be a default group name of injectors, for example the group name of the most recently activated injector as determined at the initialization block 604. Fast-paths may be used to activate a different injector. Processing continues to block 608 where user input (action) to the client data processing system is monitored. Depending on the client data processing system embodiment, user input may be keypad invocations, screen touches, mouse selections, voice input, or any other method for directing input from a user. Upon detection of a user action, processing continues to block 610. If it is determined at block 610 that the user selected to manage injectors, then processing continues to block 612 where manage injectors processing is performed. Block 612 then continues back to block 608 to await further user action.

If it is determined at block 610 that the user did not selected to manage injectors, then processing continues to block 614. If block 614 determines that the user invoked an injector activation fast-path, then processing flows to block 616 where active injector information is set according to the fast-path attributes. Active Injector Information is preferably maintained in persistent storage so that block 604 can appropriately initialize with a currently active injector at a future restart of the client interface. Processing continues from block 616 back to block 608 to await further user action.

If at block 614, an injector activation fast-path was not determined to be invoked, the user action detected at block 608 is processed in an appropriate manner as applicable to the embodiment of the client data processing system. For example, termination of the client data processing system interface, or any other user action to the client data processing system interface is processed.

FIG. 6 processing of blocks 602, 604, 606, 610, 612, 614, and 616 occurs outside the context of any client interface presented to said client data processing system by a remote data processing system.

FIGS. 7, 8, 9, and 10 depict flowcharts for describing a preferred embodiment of the manage injectors aspect of the present invention, as referred to at block 612. FIGS. 7, 8, 9, and 10 are performed outside the context of any interface presented to the client data processing system by a remote data processing system.

Figure 7:
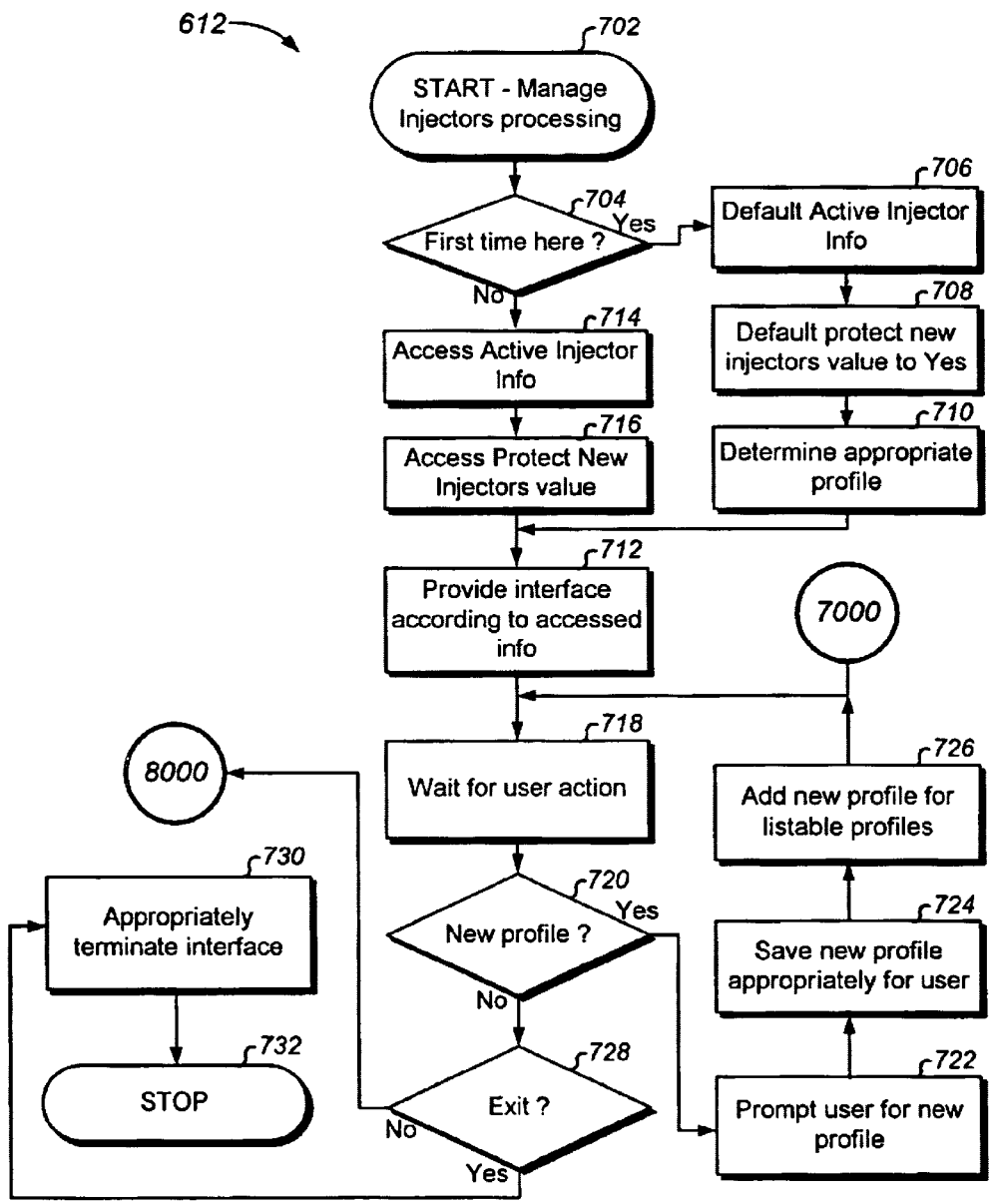
FIGS. 7, 8, 9, and 10 depict flowcharts for describing a preferred embodiment of the manage injectors aspect of the present invention.

With reference now to FIG. 7, the processing of block 612 begins at block 702 and proceeds to block 704. If block 704 determines it is the first time for block 704 to be executed by the client data processing system, then processing continues to block 706 where active injector information is defaulted, then to block 708 where the protect new injectors value is defaulted, then to block 710 where an appropriate profile is determined, and then to block 712 where an appropriate interface is made available to the user of the client data processing system. Alternate embodiments of block 710 include a folder name, user name of authenticated user, a group name, a device identifier, or the like.

If block 704 determines it is not the first time at block 704 at the client data processing system, then processing continues to block 714 where previously saved active injector information is accessed, then to block 716 where the protect new injectors value is accessed, and then to block 712.

In one embodiment of block 712, the manage injectors window 300 is displayed. Block 712 flows to block 718 where processing waits for user action to the client data processing system.

Upon detecting user action at block 718, processing continues to block 720. If at block 720, the user action detected at block 718 was for creating a new profile, then processing continues to block 722 where the user is prompted for a new profile, then to block 724 where the profile is saved, then to block 726 where the new profile is added to the list of listable profiles, and then back to block 718 to await further user action. In one embodiment of block 726, the new profile is added for availability by a group list pulldown 312.

If at block 720, it is determined that the user did not select to create a new profile, then processing continues to block 728. If at block 728, it is determined that the user selected to exit the manage injectors interface, then the interface is terminated appropriately at block 730 and the process terminates at block 732. Various embodiments of client data processing systems may not require a specific action to terminate the interface.

Figure 8:
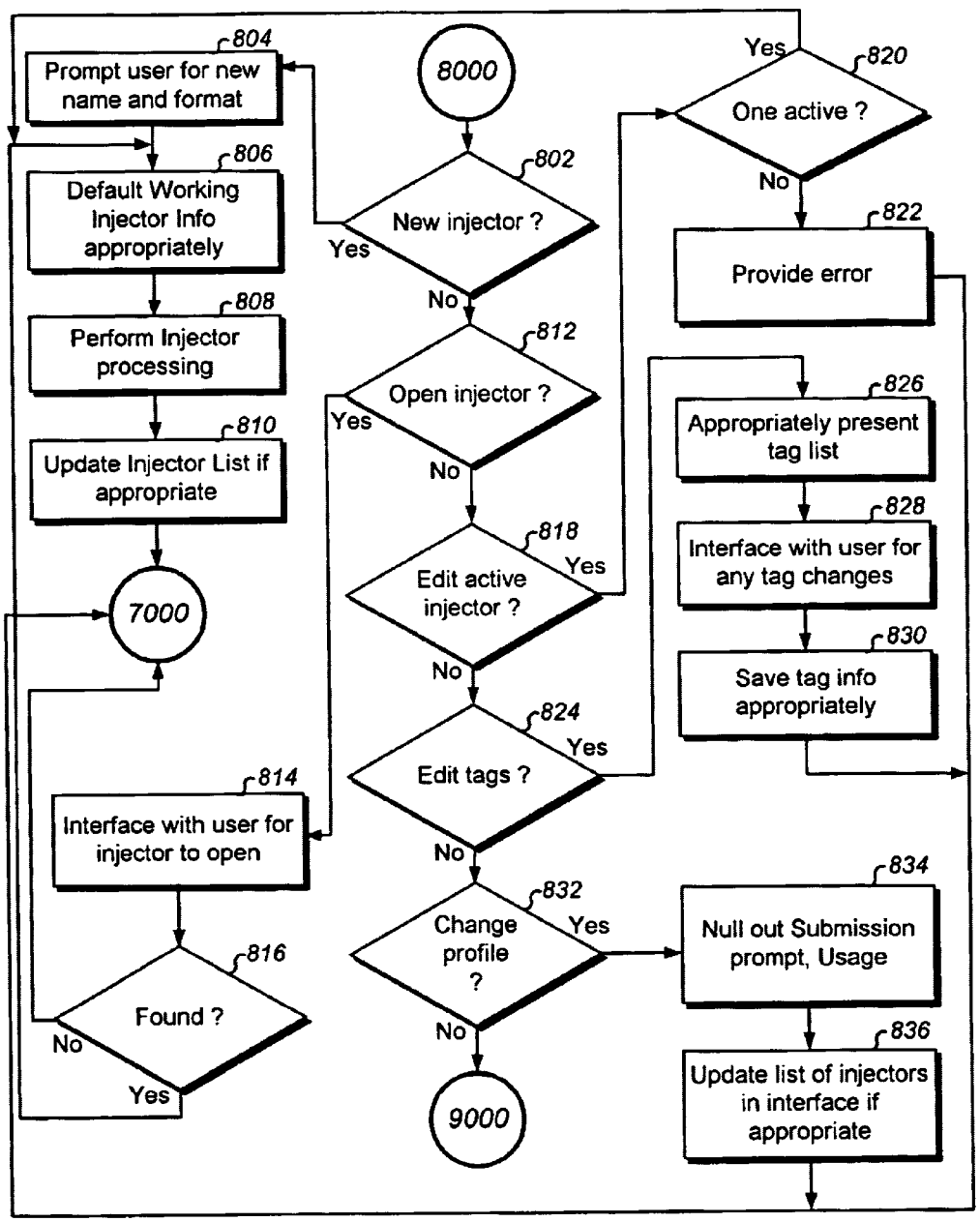

If at block 728, it is determined that the user did not select to exit, then processing continues to block 802 of FIG. 8 by way of off-page connector 8000.

With reference now to FIG. 8, block 802 determines if the user selected to create a new injector. If block 802 determines the user selected to create a new injector, then the user is prompted at block 804 for a new name and format, a working injector information data structure is defaulted at block 806, and injector processing is performed at block 808. Upon completion of block 808 injector processing, block 810 updates the current profile's (group's) injector list if appropriate. The user may have cancelled out of injector processing or may have saved the injector information from injector processing. Block 810 handles either case appropriately and then continues back to block 718 of FIG. 7 by way of off-page connector 7000.

If it is determined at block 802, that the user did not select to create a new injector, processing flows to block 812. If block 812 determines the user selected to open an existing injector, then block 814 interfaces with the user for the injector to open, and processing continues to block 816. If block 816 determines the requested injector was nowhere to be found when interfacing with the user, then processing continues back to block 718. Obvious error handling is handled by block 814. If block 816 determines that the injector was found, then processing continues to block 806 where the working injector information is defaulted to the requested injector. Processing flows therefrom as previously described.

If at block 812, it is determined that the user did not select to open an injector, then processing continues to block 818. If block 818 determines the user selected to edit the active injector, then block 818 determines if there is one active. If block 820 determines there is an active injector, then processing continues to block 806. If block 820 determines there is not an active injector, then an error is provided to the user at block 822 and processing continues back to block 718.

If block 818 determines the user did not select to edit the active injector, then processing flows to block 824. If block 824 determines the user selected to edit tags (i.e. labels), then an editable list of tags is appropriately presented to the user at block 826, the user interfaces to the list for any changes at block 828, tag alterations are saved at block 830, and processing continues back to block 718. In one embodiment, standardized tags are presented as unalterable at block 826.

If block 824 determines the user did not select to edit tags, then block 832 continues. If block 832 determines the user selected to change the current profile to one of his other candidate profiles, then block 834 initializes the submission prompt value and usage value to no setting, then block 836 updates the eligible list of injectors for the current profile, and then processing continues back to block 718. Block 836 may default an injector from the list, or keep the same injector (e.g. user changed to same injector as previous), or cause the system to have no active injector (i.e. nothing displayed in active injector entry field 314).

Figure 9:
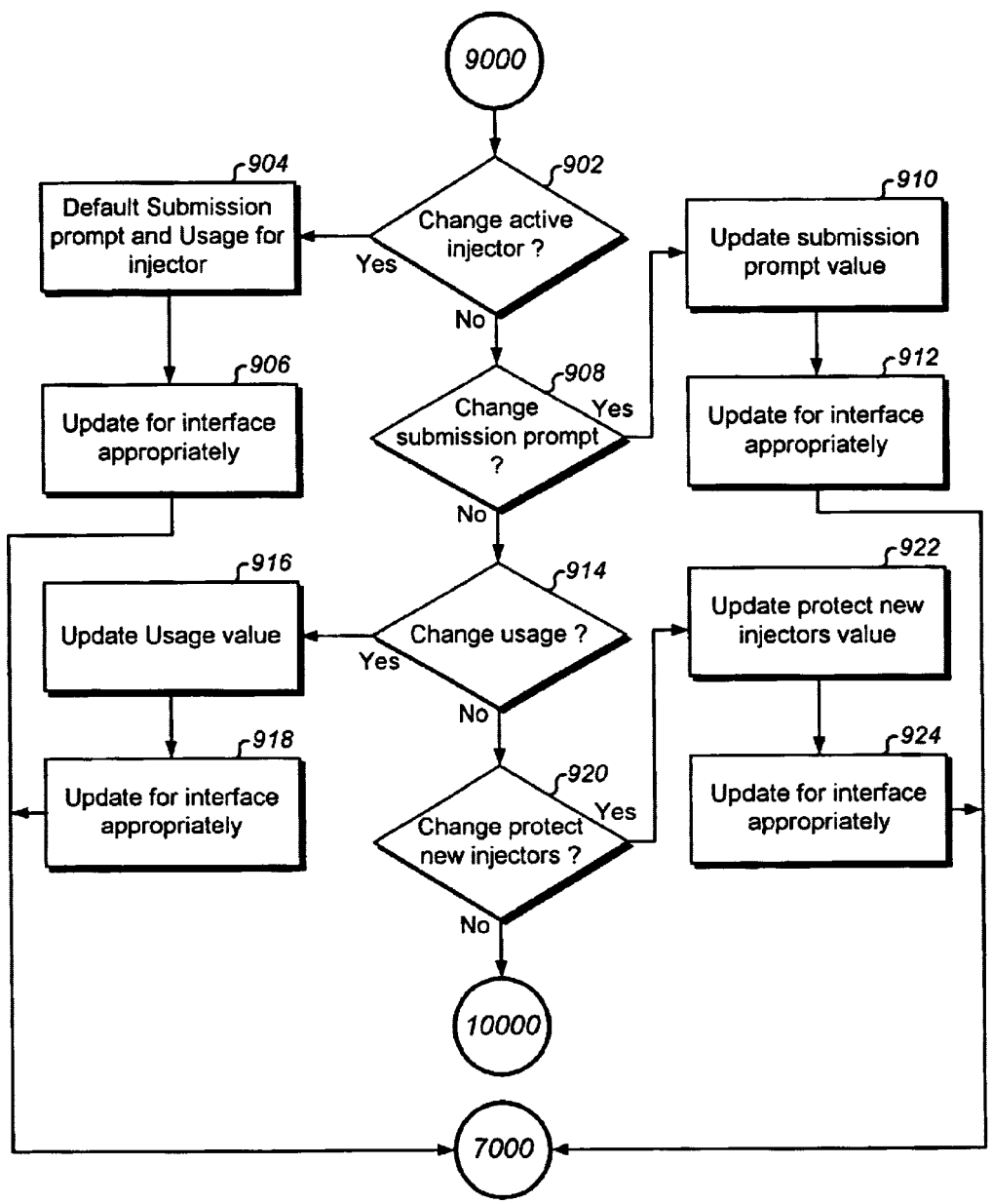

If block 832 determines that the user did not select to change to a different profile, then processing continues to block 902 of FIG. 9 by way of off-page connector 9000.

If at block 902, it is determined that the user selected to change the active injector (user used interface other than a fast-path), then block 904 defaults the submission prompt value and usage value for the injector, then block 906 updates the interface, if appropriate, depending on the embodiment, and then processing continues back to block 718 of FIG. 7 by way of off-page connector 7000.

If at block 902, it is determined that the user did not select to change the active injector, then processing continues to block 908. If block 908 determines the user selected to change the submission prompt value, then block 910 updates the value, block 912 updates the interface of the client data processing system if appropriate, and processing continues back to block 718.

If at block 908, it is determined that the user did not select to change the submission prompt value, then processing continues to block 914. If it is determined at block 914 that the user selected to change the usage value, then block 916 updates the value, and the client data processing system interface is updated if appropriate at block 918. Processing continues therefrom back to block 718.

If it determined at block 914 that the user did not select to change the usage value, then processing continues to block 920. If it is determined at block 920 that the user selected to change the protect new injectors option, then block 922 updates the option's new value, block 924 updates the user interface if appropriate, and processing continues back to block 718.

Figure 10:
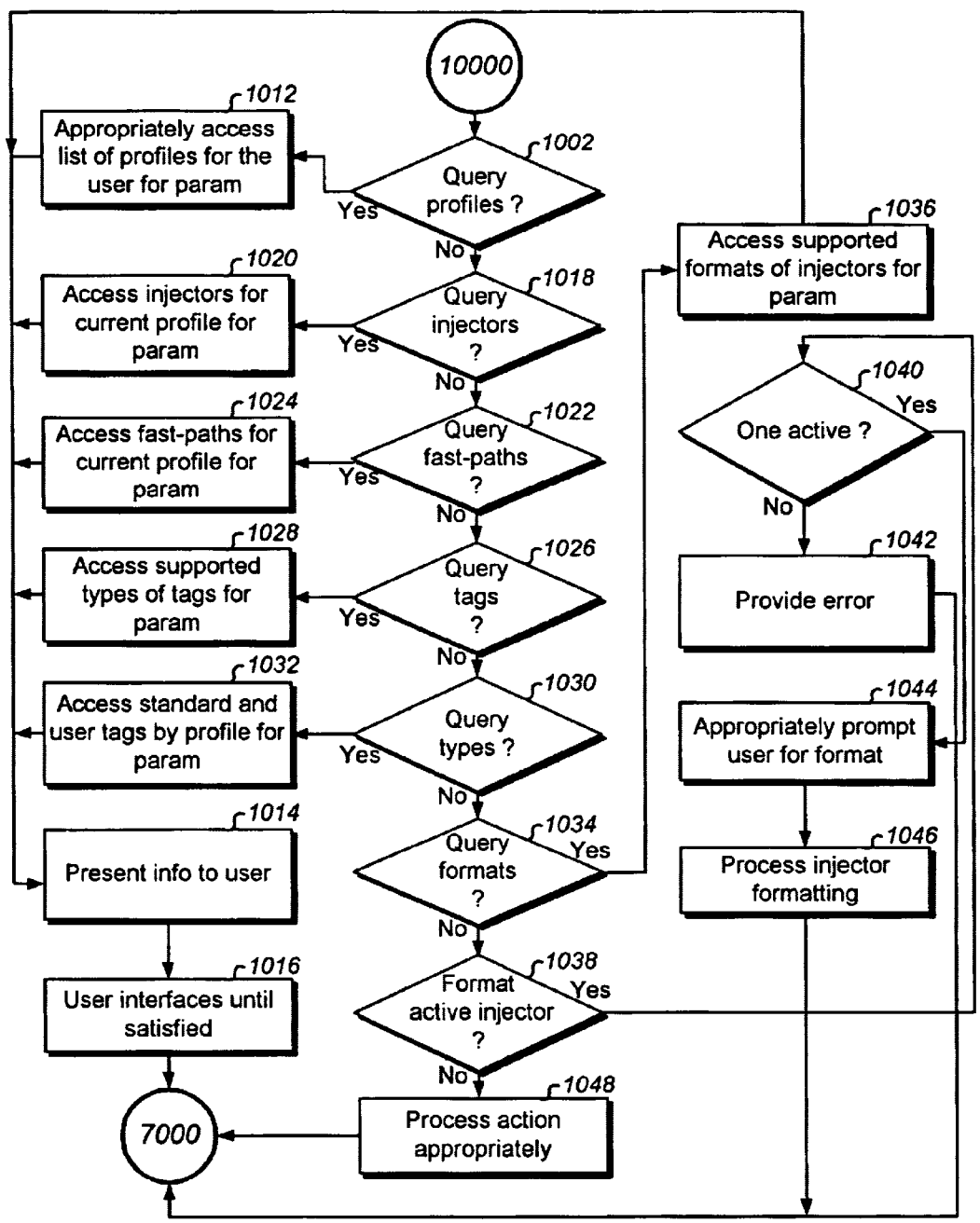

If block 920 determines the user did not select to change the protect new injectors option, then processing flows to block 1002 of FIG. 10 by way of off-page connector 10000.

If block 1002 determines the user selected to query his available profiles, then processing continues to block 1012 where the list is accessed and built into a parameter that is then accessed in block 1014 where the information is presented to the user. Thereafter, block 1016 interfaces the user with the list until he is satisfied, and processing continues back to block 718 of FIG. 7 by way of off-page connector 7000.

If block 1002 determines that the user did not select to query profiles, then processing continues to block 1018. If block 1018 determines the user selected to query his available injectors for the current profile, then processing continues to block 1020 where the list is accessed and built into a parameter that is then accessed in block 1014 as previously described.

If block 1018 determines that the user did not select to query available injectors, then processing continues to block 1022. If block 1022 determines the user selected to query configured fast-paths for his injectors, then processing continues to block 1024 where the list is accessed and built into a parameter that is then accessed in block 1014 as previously described.

If block 1022 determines that the user did not select to query configured fast-paths, then processing continues to block 1026. If block 1026 determines the user selected to query tags (labels), then processing continues to block 1028 where the list is accessed and built into a parameter that is then accessed in block 1014 as previously described.

If block 1026 determines that the user did not select to query tags, then processing continues to block 1030. If block 1030 determines the user selected to query the supported data types, then processing continues to block 1032 where the list is accessed and built into a parameter that is then accessed in block 1014 as previously described.

If block 1030 determines that the user did not select to query data types, then processing continues to block 1034.

If block 1034 determines the user selected to query supported injector formats, then processing continues to block 1036 where the list is accessed and built into a parameter that is then accessed in block 1014 as previously described.

If block 1034 determines that the user did not select to query formats, then processing continues to block 1038. If block 1038 determines the user selected to format the active injector, then processing continues to block 1040.

If at block 1040, it is determined that there is not one active, then an error is provided at block 1042 and processing continues back to block 718. If at block 1040, there is an active injector, then block 1044 prompts the user for the desired format, block 1046 processes injector formatting, and processing continues back to block 718.

If it is determined at block 1038 that the user did not select to format the active injector, then processing flows to block 1048 where other user actions are processed appropriately, and then back to block 718. Depending on the embodiment, other user actions include those that are not pertinent in maintaining injector data of the present invention, for example, window sizing in a windows embodiment.

Figure 11:
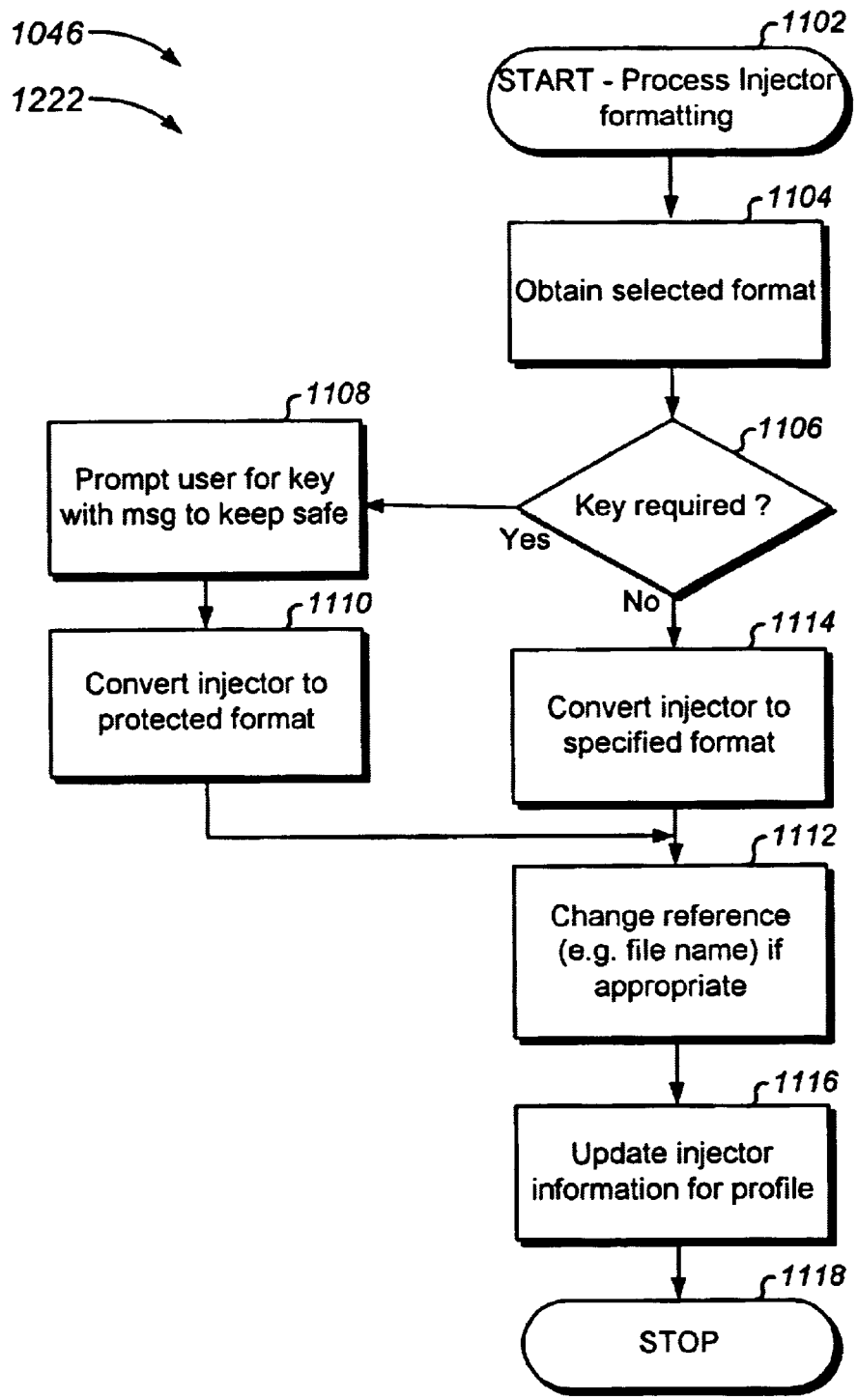
FIG. 11 depicts a flowchart for describing a preferred embodiment of the process injector formatting aspect of the present invention.

FIG. 11 depicts a flowchart for describing a preferred embodiment of the process injector formatting aspect of the present invention. FIG. 11 describes the processing of block 1046 in FIG. 10, and of block 1222 in FIG. 12.

Processing begins at block 1102 and continues to block 1104 where the user selected format is obtained. Thereafter, if block 1106 determines that a key is required for the selected format, then block 1108 prompts the user for a key, then block 1110 converts the injector using the key, then block 1112 changes the injector reference, for example, the file name, if appropriate. Thereafter, block 1116 updates the injector information for the current profile, and processing terminates at block 1118.

If at block 1106, a key is not required for the selected format, block 1114 converts the injector as the user desired, and processing continues to block 1112 which was described.

Thus, the user can specify a key, for example an encryption key, or a password, to be used in maintaining the injector in a protected form from unauthorized access. The encoded format may be decoded with the key.

Figure 12:
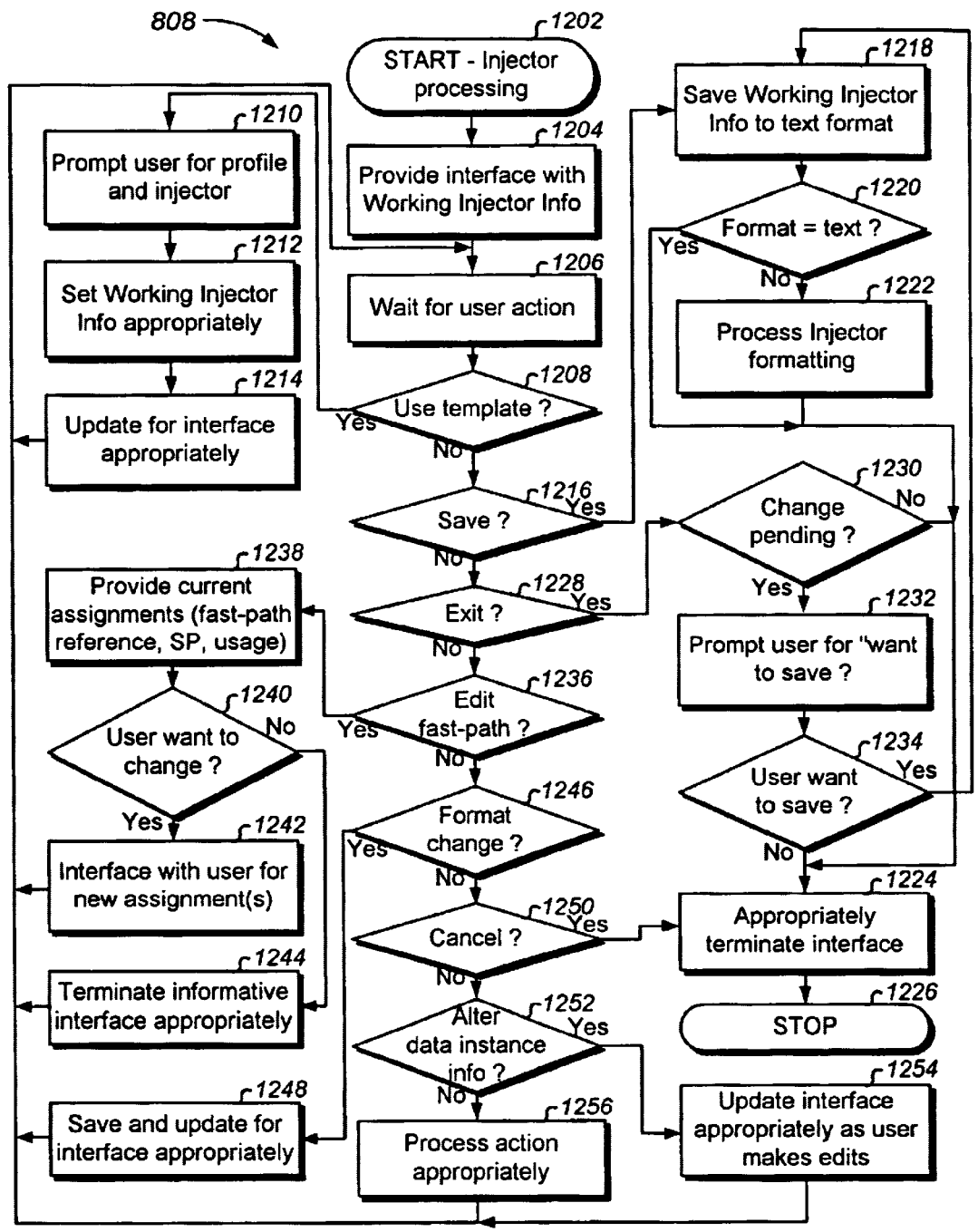
FIG. 12 depicts a flowchart for describing a preferred embodiment of the injector processing aspect of the present invention.

FIG. 12 depicts a flowchart for describing a preferred embodiment of the injector processing aspect of the present invention. FIG. 12 describes block 808 of FIG. 8 in greater detail. The process begins at block 1202 and continues to block 1204 where an appropriate injector processing interface is made available to the user. In one client data processing system embodiment, block 1204 provides the edit injector window 400 to the user. In such an embodiment the "Use Template" option of the File pulldown is grayed out when an injector is opened rather than being newly created. In another client data processing system embodiment, an appropriate interface is made available to the user.

Block 1204 flows to block 1206 where processing waits for user action. Upon detection of a user action, processing flows to block 1208. If block 1208 determines that the user selected to use a previously defined injector as a starter template for starting a new injector, then block 1210 prompts the user for the existing injector, then block 1212 sets a working injector information data structure to the injector specified at block 1210, then block 1214 updates the client data processing system interface appropriately, and processing continues therefrom back to block 1206 to await further action from the user.

If block 1208 determines the user did not select to use a ready-made injector, then processing continues to block

1216. If block 1216 determines the user selected to save the injector being edited, then block 1218 saves the working injector information to a textual format (e.g. flat text, or html), and processing continues to block 1220. If block 1220 determines that the selected injector format was text, then block 1224 appropriately terminates the interface, and processing terminates at block 1226.

If block 1220 determines the selected injector format was not text, then block 1222 processes injector formatting which was described by FIG. 11. Processing continues therefrom to block 1224.

If block 1216 determines the user did not select to save the currently edited (working) injector, then processing continues to block 1228. If block 1228 determines the user selected to exit from editing an injector, then processing continues to block 1230. If block 1230 determines there is one or more edits pending, then block 1232 prompts the user if a save is desired, and block 1234 determines if the user wants to save the changes. If at block 1234 the user does not want to save the changes, then processing continues to block 1224. If the user did want to save the changes, then block 1234 flows to block 1218, which was previously described.

If block 1230 determines the user had no changes pending, then block 1224 continues the processing.

If block 1228 determines the user did not select to exit editing the injector, then processing continues to block 1236. If block 1236 determines the user selected to edit a fast-path for the currently edited injector, then block 1238 provides the user's current (if any) fast-path assignment to the injector, and subsequently block 1240 determines if the user wants to change the assignment (if any). Block 1238 shows that an injector is also associated with a particular submission prompt and usage value setting.

If block 1240 determines the user wants to change the fast-path assignment, then block 1242 enables the user to specify the desired assignment, and processing continues to back to block 1206 to await further user action. Thus, for example, a set of keypad stroke(s) (i.e. hot-key) may be configured to instantly activate a particular injector.

If block 1240 determines the user did not want to change the current fast-path setting for the edited injector, then block 1244 terminates the informative interface appropriately, and then processing continues back to block 1206.

If block 1236 determines the user did not select to modify the injector's fast-path assignment, then processing flows to block 1246. If block 1246 determines the user selected to change the format for the current edited (working) injector, then the selected format is saved for the currently edited injector and any interface is updated if appropriate, at block 1248. Processing continues thereafter back to block 1206.

If block 1246 determines the user did not select a new injector format, then processing continues to block 1250. If block 1250 determines the user selected to cancel out of editing the injector, then processing continues to block 1224.

If block 1250 determines the user did not select to cancel, then processing continues to block 1252. If block 1252 determines the user selected to alter data instance information of the injector, then block 1254 interfaces with the user to update data instance information, and processing continues back to block 1206. In one embodiment, the user interfaces to data instances 412. In another embodiment, SQL column names are associated to data items in an appropriate interface.

If block 1252 determines the user did not select to alter data instance information, then processing continues to block 1256 for processing other user actions that may be detected. Thereafter, processing returns to block 1206.

Figure 13:
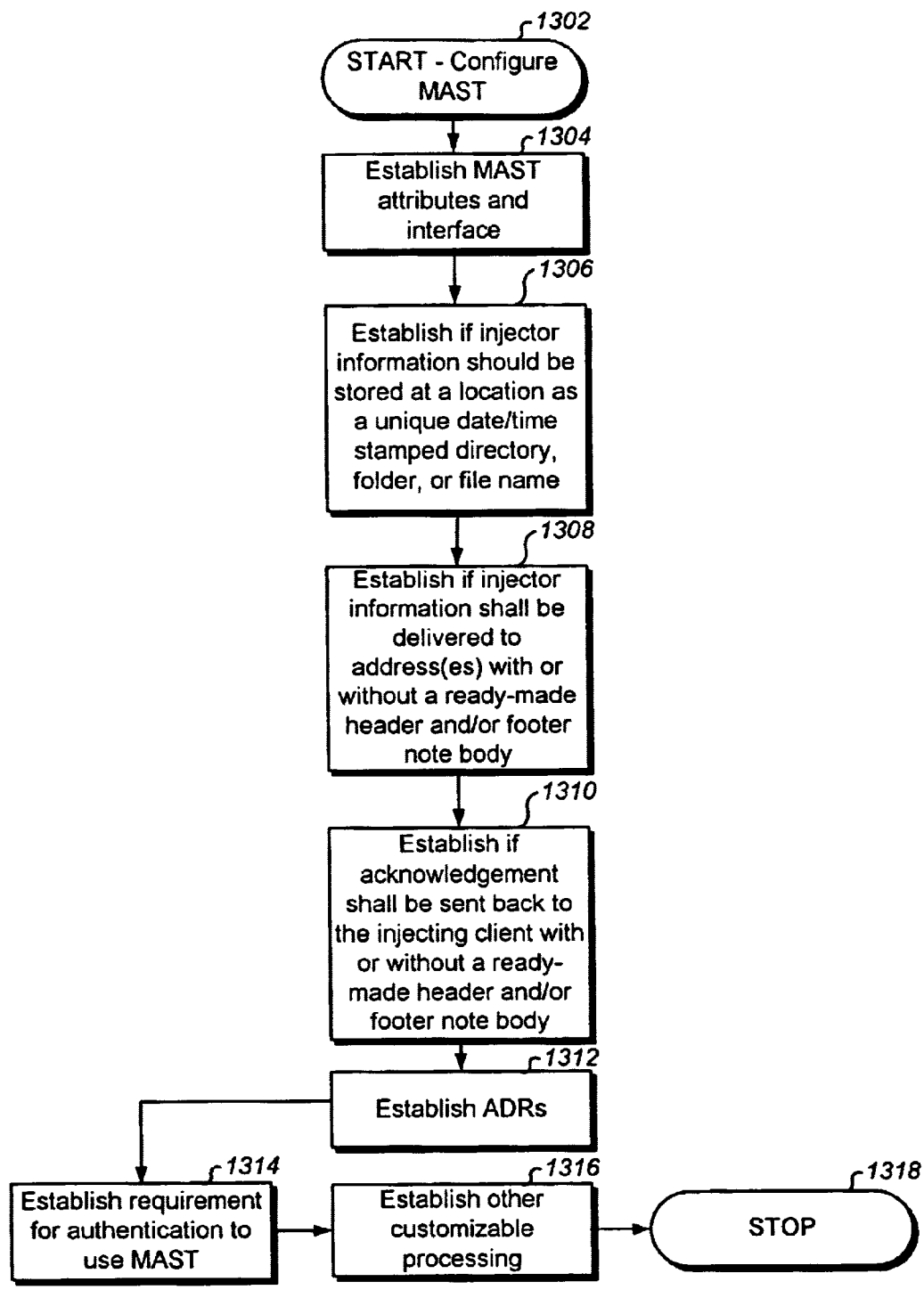
FIG. 13 depicts a flowchart for describing a preferred embodiment of the configure Minimal Action Solicitation prompT (MAST) aspect of the present invention.

FIG. 13 depicts a flowchart for describing a preferred embodiment of the configure MAST aspect of the present invention. In one embodiment, the configure data injection object window 500 is used to accomplish FIG. 13 processing. In another embodiment, a flat text file, or html file, is edited to configure the MAST.

The process begins at block 1302 in association with a MAST that a user can act on in a client data processing system interface. In one embodiment, the MAST is a graphical object, and FIG. 13 provides configuration of constraints for the client user to respond to the MAST. Processing continues to block 1304 where MAST attributes and the MAST interface is established. Thereafter, block 1306 establishes whether to store a client's injector information at an accessible location as a unique date/time stamped directory or file name. Thereafter, block 1308 establishes if a client's injector information should be automatically built into an email distribution to specified addresses. Thereafter, block 1310 establishes if an acknowledgement email should be sent back to the client, thereby acknowledging injected data to the MAST. Thereafter, block 1312 establishes the sought data instance information including the labels (tags), the seek requirements, the acceptable types, and any validity criteria. Thereafter, block 1314 establishes any desired authentication to the MAST. Thereafter, any other customizable processing (actions) is established at block 1316, and the process terminates at block 1318. Alternate embodiments may specify special processing to be performed upon receipt of particular label(s).

Figure 14:
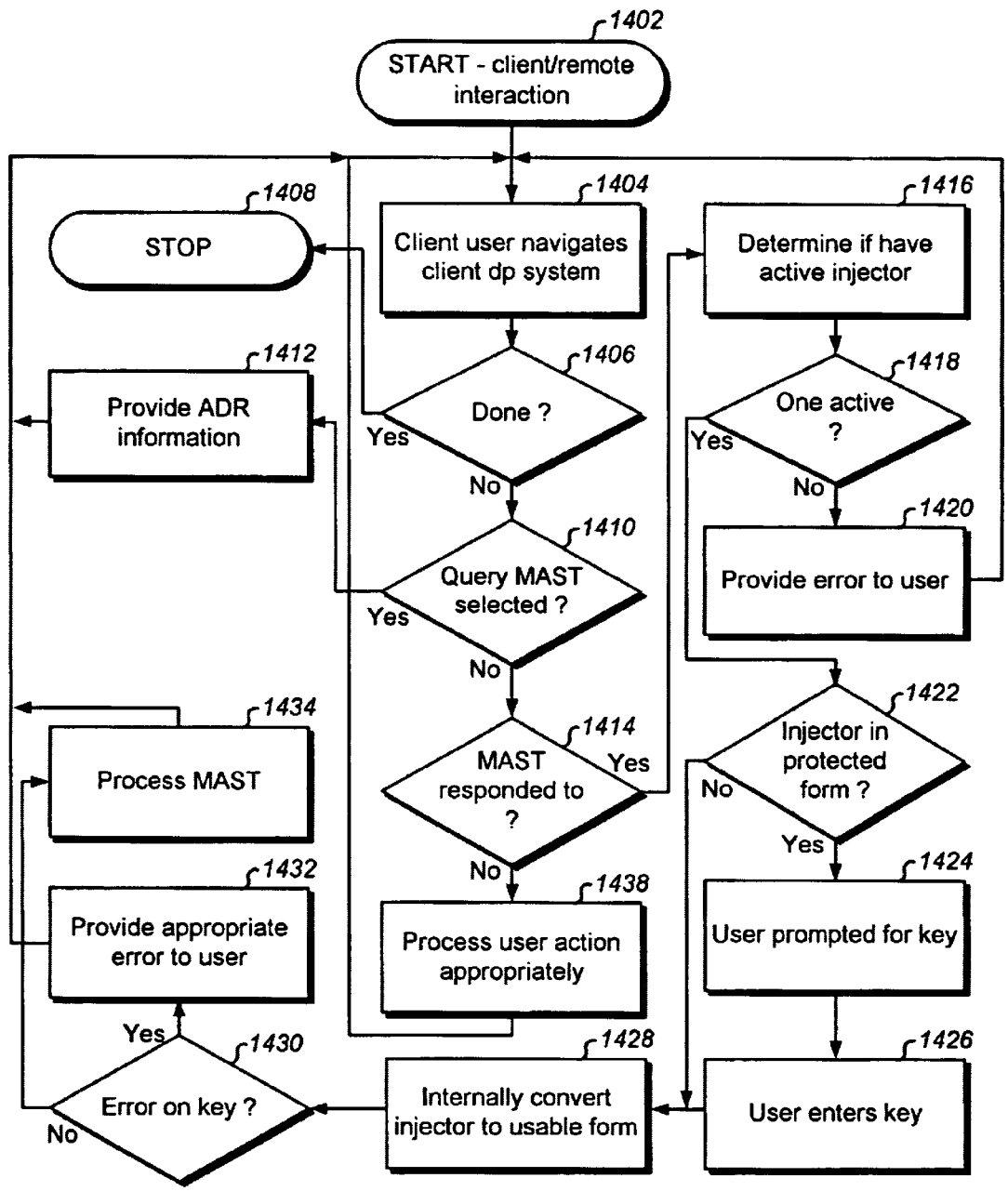
FIG. 14 depicts a flowchart for describing a preferred embodiment of the client/remote interaction aspect of the present invention.

FIG. 14 depicts a flowchart for describing a preferred embodiment of the client/remote interaction aspect of the present invention. FIG. 14 processing depicts that processing which is within the context of client interface presented to said client data processing system by a remote data processing system. The process begins at block 1402 and proceeds to block 1404 where a client user navigates the interface of his client data processing system. In one embodiment, the user navigates a web browser at block 1404. Processing then flows to block 1406 upon a particular detected action.

If block 1406 determines that the user is completed with navigating the interface of the client data processing system, then the process terminates at block 1408.

If block 1406 determines the user is not done interfacing to the client data processing system, then processing continues to block 1410. If block 1410 determines the user selected to query a MAST at the client data processing system, then block 1412 provides the application data rules (ADRs) of the MAST and processing continues back to block 1404. In one embodiment, the user right mouse clicks on a graphical image defined to be a MAST, and the query processing of block 1412 is performed. Depending on the embodiment, block 1412 processing is accomplished by: a local executable on behalf of the remote data processing system, or transmission to the remote data processing system for retrieving ADRs, or access to html at the client system, or using any other conventional client/server methodology.

If block 1410 determines the user did not query a MAST, then processing continues to block 1414. If block 1414 determines the client user responded to a MAST, then block 1416 determines if there is an active injector at the client data processing system. Thereafter, if block 1418 determines there is not an active injector, then an error is provided to the user at block 1420 and processing returns to block 1404.

If block 1418 determines there is an active injector, then processing continues to block 1422. If block 1422 determines the client data processing system is maintaining the injector in a protected form, then block 1424 prompts the user for the key, block 1426 interfaces with the user to get the key, block 1428 converts the injector into a usable form, and processing continues to block 1430. In one embodiment, the client data processing system internally converts the protected form of the injector into a form suitable for the remote data processing system that presented the MAST. If block 1422 determines the injector is not in protected form, then processing continues directly to block 1428.

If block 1430 determines an error occurred for the case a conversion had to be performed on a protected form injector, then an error is provided to the user at block 1432, and processing continues back to block 1404. If block 1430 determines an error did not occur, then block 1434 processes the MAST that was determined by block 1414. Thereafter, processing continues back to block 1404.

If block 1414 determines the MAST was not responded to (or invoked), then processing continues to block 1438 where other user actions are processed accordingly, and then back to block 1404.

In one embodiment, much (, or all) of FIG. 14 processing occurs at the client data processing system with little (, or no) communications to the remote data processing system. This is accomplished with a (local) client data processing system located executable, rigorously defined ADRs from the remote data processing system, or a combination thereof. Various embodiments could, for example, include a JAVA program, JAVA script, html, or combinations thereof.

In another embodiment, much communication is required to the remote data processing system for retrieving needed data, rules, executables, or combinations thereof. As well known to those skilled in the art, much processing may alternatively be performed by the remote data processing system.

Figure 15:
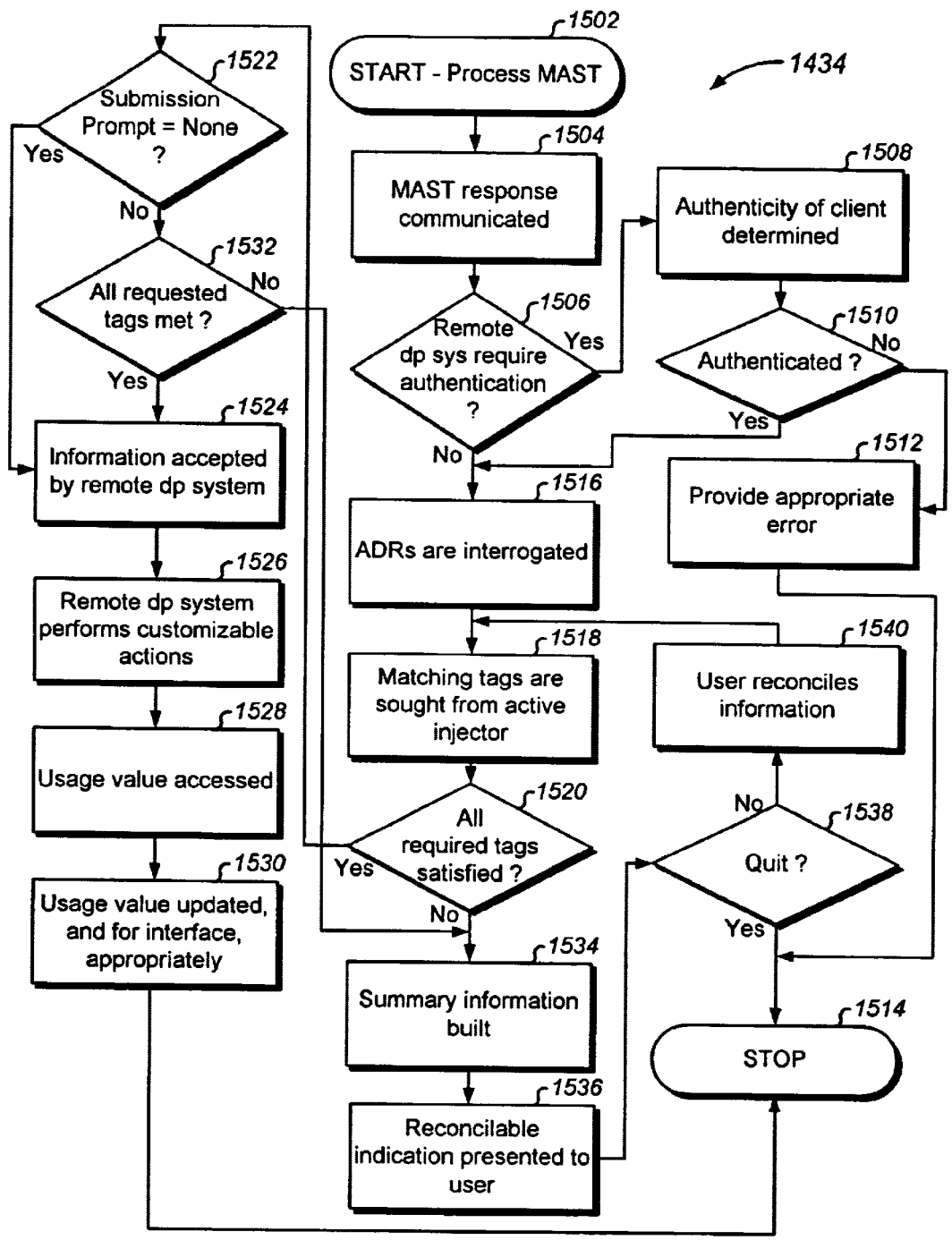
FIG. 15 depicts a flowchart for describing a preferred embodiment of the process Minimal Action Solicitation prompT (MAST) aspect of the present invention.

FIG. 15 depicts a flowchart for describing a preferred embodiment of the process Minimal Action Solicitation prompT (MAST) aspect of the present invention. FIG. 15 provides detailed processing of block 1434.

The process begins at block 1502 and proceeds to block 1504 where a MAST response is communicated to the remote data processing system. In another embodiment, the request is communicated locally to a local executable executing on behalf of the remote data processing system. Thereafter, block 1506 determines if the remote data processing system specified an authenticated use of the MAST. If so, authenticity of the client data processing system is determined at block 1508, for example, by prompting the user for the prescribed password, or accepting a saved "cookie" from a previous access. Thereafter, if at block 1510 the user was not authenticated, then an appropriate error is provided to the user at block 1512 and the process terminates at block 1514. If block 1510 determines the user is authenticated, then processing continues to block 1516 where the remote data processing system application data rules are interrogated. If it was determined at block 1506 that the remote data processing system did not specify authenticated use of the MAST, then processing flows to block 1516 where ADRs are accessed.

Block 1516 continues to block 1518 where labels of the ADRs are used to seek data from the active injector information. Data instances of the injector are further verified with any validity criteria at block 1518, and the types of data are appropriately compared. Thereafter, block 1520 determines if all required labels of the ADRs have been satisfied by the active injector. If the ADRs are not satisfied, then processing continues to block 1534 for building of a report for a reconcilable indication, then to block 1536 for presenting the reconcilable indication to the user. The reconcilable indication provides the user with a summary of how well (or how poorly) the active injector mapped to the ADRs. The user can accept, browse, or alter information in the reconcilable indication. Block 1536 then flows to block 1538.

If is determined at block 1538 that the user wants to quit from the reconcilable indication, then the process terminates at block 1514. If it is determined at block 1538 that the user wants to reconcile the information, then the user interfaces to the reconcilable indication for reconciling (user altering of) the requested data to meet the ADR constraints, at block 1540. Thereafter, processing continues back to block 1518 for a recheck of how the reconciliated data maps to the ADRs.

If all required remote data processing system sought data instances (of ADRs) is satisfied at block 1520, then block 1522 determines the injector's submission prompt value. If block 1522 determines the value is for no prompt, then processing continues to block 1524. If block 1522 determines the submission prompt value is to prompt, then processing flows to block 1532. If block 1532 determines that all requested labels of the ADRs were not matched, then processing continues back to block 1534 for reconcilable indication processing. Requested labels are those labels that are preferred to get for the remote data processing system, but not required. If block 1532 determines requested labels have been met (as well as the required labels up to this point), then processing continues to block 1524.

Injector information is accepted at block 1524 by the remote data processing system. That is, injector data is injected to the remote data processing system. Only the subset of the active injector data that is sought by the remote data processing system is accepted. Thereafter, customizable actions are performed at block 1526, the active injector usage value is accessed at block 1528, and a numbered usage value is updated if applicable at block 1530. Block 1530 then flows to block 1514 where processing terminates.

ALTERNATIVE EMBODIMENTS

Blocks 1506 and/or 1516 may be accomplished with a client data processing located executable, remote data processing system indicating its requirement via transmission protocol, or simply a response back from the injector communicated at block 1504. Blocks 1518 and 1519 may be performed at the client data processing system, remote data processing system, or combination thereof. Block 1526 customizable actions are performed at the client data processing, at the remote data processing system, or a combination thereof, as configured at the remote data processing system. Blocks 1528 and 1530 are performed at the client data processing system. Block 1536 may be processed as the result of a client data processing system located executable, transmission from the remote data processing system, or any other client/server protocol methodology. Block 1524 may perform transmission from the client data processing system to the remote data processing system, or alternatively the remote data processing system may simply accept the communication (transmission) of the injector data already communicated by a previous FIG. 15 block, for example block 1504. Block 1530 causes the client data processing system to have no active injector if expiration occurred, and in any case the interface is updated if appropriate according to the embodiment.

Thus, in one embodiment, much (, or all) of FIG. 15 processing occurs at the client data processing system with little (, or no) communications to the remote data processing system. This is accomplished with a (local) client data processing system located executable, rigorously defined ADRs from the remote data processing system, or a combination thereof. Various embodiments could, for example, include a JAVA program, JAVA script, html, or combinations thereof.

PASSIVE MAST EMBODIMENT OF THE PRESENT INVENTION

A MAST may also be passive in that there is no specific prompt action initiated by the remote data processing system. The MAST is simply a user recognized ready state of the remote data processing system. A user can broadcast an injection request to the remote data processing system as the first communication in client/remote interaction.

The time is approaching where people can carry a handheld device containing user labeled (tagged) information for communication to a variety of systems. For example, it would be convenient for someone to automatically transmit personal information to a receiving system of a store, business, or other entity, which today requires communication of the information verbally, or by hand written form. PDA 110 could inject data to remote data processing systems for situations where today people complete paper forms by hand, repeating the same information for a variety of in-person situations. Human communications without technology takes time and introduces error.

The passive MAST embodiment allows a user, for example, to store the "usual" (or a) shopping list on the client data processing system as an injector. Then, the user can become in close proximity (as described by the present invention) with a remote data processing system of a particular store, recognize the passive MAST of a store's remote data processing system, broadcast the shopping list as an injector request to the remote data processing system, and the remote data processing system will perform customizable actions for providing product availability, selections and aisle locations. Other injectors can be used for completing automatic registration to government, business, or leisure entities.

The user may maintain many various injectors on the handheld wireless client data processing system for injecting to a variety of remote data processing systems in a variety of situations, all to save time from verbal and/or hand written human communications. Thus, it is a further advantage of the present invention in providing a better method in communicating data than human communications during personal attendance situations, and re-providing that data to other situations which require the same data.

Figure 16:
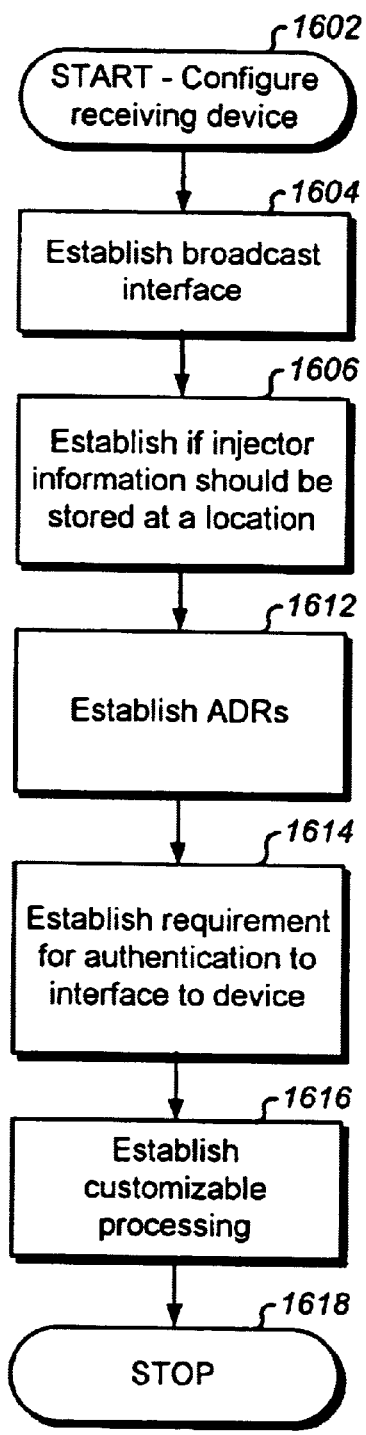
FIG. 16 depicts a flowchart for describing a preferred embodiment of the configure receiving device (i.e. remote data processing system) aspect of the passive MAST embodiment of the present invention.

FIG. 16 depicts a flowchart for describing a preferred embodiment of the configure receiving device (i.e. remote data processing system) aspect of the passive MAST embodiment of the present invention. The process begins at block 1602 and processing continues to block 1604 where the receiving device broadcast interface is established. A well known wireless band, frequency, socket, or the like, is established for listening for broadcasts from client data processing systems. Thereafter, block 1606 establishes whether to store a client's injector information at an accessible location. Thereafter, block 1612 establishes the sought data instance information including the labels (tags), the seek requirements, the acceptable types, and any validity criteria. Thereafter, block 1614 establishes any desired authentication required to interface to the receiving device (i.e. remote data processing system). Thereafter, customizable processing (actions) is established at block 1616, and the process terminates at block 1618. Various embodiments may specify special processing to be performed upon receipt of particular label(s). Customizable processing (actions) can be any processing according to the purpose for having the remote data processing system.

With reference back to FIG. 14, the flowchart shall be described in terms of the passive MAST embodiment of the client/remote interaction aspect of the present invention. The process begins at block 1402 and proceeds to block 1404 where a client user navigates the interface of his wireless (analog, digital, infrared, etc) client data processing system. Processing then flows to block 1406 upon a particular detected action.

If block 1406 determines that the user is completed with navigating the interface of the client data processing system, then the process terminates at block 1408.

If block 1406 determines the user is not done interfacing to the client data processing system, then processing continues to block 1410. If block 1410 determines the user selected to query the passive MAST of the remote data, processing system (receiving device), then block 1412 provides the application data rules (ADRs) back to the client data processing system after communicating a broadcast query from the client data processing system to the remote data processing system. Block 1412 may perform communication setup processing to complete the processing. Processing then continues back to block 1404. If block 1410 determines the user did not query the passive MAST, then processing continues to block 1414. If block 1414 determines the client user responded to a passive MAST (i.e. selected to transmit an injector to the remote data processing system), then block: 1416 determines if there is an active injector at the client data processing system. Thereafter, if block 1418 determines there is not an active injector, then an error is provided to the user at block 1420 and processing returns to block 1404.

If block 1418 determines there is an active injector, then processing continues to block 1422. If block 1422 determines the client data processing system is maintaining the injector in a protected form, then block 1424 prompts the user for the key, block 1426 interfaces with the user to get the key, block 1428 converts the injector into a usable form, and processing continues to block 1430. In one embodiment, the client data processing system internally converts the protected form of the injector into a form suitable for the remote data processing system. If block 1422 determines the injector is not in protected form, then processing continues directly to block 1428.

If block 1430 determines an error occurred for the case a conversion had to be performed on a protected form injector, then an error is provided to the user at block 1432, and processing continues back to block 1404. If block 1430 determines an error did not occur, then block 1434 processes the passive MAST (i.e. processes data injection to the remote data processing system) that was determined by block 1414. Thereafter, processing continues back to block 1404.

If block 1414 determines the MAST was not responded to, then processing continues to block 1438 where other user actions are processed accordingly, and then back to block 1404.

In one embodiment, much of FIG. 14 processing occurs at the client data, processing system with little communications to the remote data processing system. This is accomplished with a (local) client data processing system located executable, rigorously defined ADRs from the remote data processing system, or a combination thereof.

In another embodiment, much communication is required to the remote data processing system for retrieving needed data, rules, executables, or combinations thereof. Alternatively, much, or most, processing may be performed by the remote data processing system.

With reference back to FIG. 15, the flowchart shall be described in terms of the process passive Minimal Action Solicitation prompT (MAST) aspect of the present invention. FIG. 15 provides detailed processing of block 1434.

The process begins at block 1502 and proceeds to block 1504 where a passive MAST response (i.e. injection request broadcast) is communicated to the remote data processing system. The request may be a first request message for communication setup in one embodiment, or may actually be a first broadcast containing data of the injector. Thereafter, block 1506 determines if the remote data processing system specified an authenticated use. If so, authenticity of the client data processing system is determined at block 1508, for example, by prompting the user for the prescribed password. Thereafter, if at block 1510 the user was not authenticated, then an appropriate error is provided by the remote data processing system to the user at the client data processing system, at block 1512, and the process terminates at block 1514. If block 1510 determines the user is authenticated, then processing continues to block 1516 where the remote data processing system application data rules are interrogated. Block 1508 may involve bi-directional protocol to accomplish authentication. If it was determined at block 1506 that the remote data processing system did not specify authenticated use, then processing flows to block 1516 where ADRs are accessed.

Block 1516 continues to block 1518 where labels of the ADRs are used to seek data from the active injector information. Data instances of the injector are further verified with any validity criteria at block 1518, and the types of data are appropriately compared. Thereafter, block 1520 determines if all required labels of the ADRs have been satisfied by the active injector. If the ADRs are not satisfied, then processing continues to block 1534 for building of a report for a reconcilable indication, then to block 1536 for presenting the reconcilable indication to the user. The reconcilable indication provides the user with a summary of how well (or how poorly) the active injector mapped to the ADRs. The user can accept, browse, or alter information in the reconcilable indication. Block 1536 then flows to block 1538.

If is determined at block 1538 that the user wants to quit from the reconcilable indication, then the process terminates at block 1514. If it is determined at block 1538 that the user wants to reconcile the information, then the user interfaces to the reconcilable indication for reconciling (user altering of) the requested data to meet the ADR constraints, at block 1540. Thereafter, processing continues back to block 1518 for a recheck of how the reconciled data maps to the ADRs.

If all required remote data processing system sought data instances (of ADRs) is satisfied at block 1520, then block 1522 determines the injector's submission prompt value. If block 1522 determines the value is for no prompt, then processing continues to block 1524. If block 1522 determines the submission prompt value is to prompt, then processing flows to block 1532. If block 1532 determines that all requested labels of the ADRs were not matched, then processing continues back to block 1534 for reconcilable indication processing. Requested labels are those labels that are preferred to get for the remote data processing system, but not required. If block 1532 determines requested labels have been met (as well as the required labels up to this point), then processing continues to block 1524.

Injector information is accepted at block 1524 by the remote data processing system. That is, injector data is injected to the remote data processing system. Only the subset of the active injector data that is sought by the remote data processing system is accepted. Thereafter, customizable actions are performed at block 1526, the active injector usage value is accessed at block 1528, and a numbered usage value is updated if applicable at block 1530. Block 1530 then flows to block 1514 where processing terminates.

ALTERNATIVE EMBODIMENTS OF THE PASSIVE MAST EMBODIMENT

Blocks 1516, 1518, 1520, and 1534 may be accomplished at the remote data processing system, or at the client data processing system if the response from successful authentication provides ADRs. Blocks 1534 and 1536 may be information transmitted back to the client data processing system from the remote data processing system, or processed completely at the client data processing system given ADRs have been transmitted already to the client data processing system. Likewise, block 1540 may involve protocol interface to the remote data processing system, or processing only at the client data processing system provided the remote data processing previously communicated the ADRs. Block 1524 may perform transmission from the client data processing system to the remote data processing system, or alternatively the remote data processing system may simply accept the communication (transmission) of the injector data already communicated by a previous FIG. 15 block, for example block 1504. Block 1530 causes the client data processing system to have no active injector if expiration occurred, and in any case the interface is updated if appropriate according to the embodiment.

Thus, in one embodiment, much of FIG. 15 processing occurs at the client data processing system with little communications to the remote data processing system. Alternatively, much processing may be performed by the remote data processing system.

In the passive MAST embodiment, typically block 1526 will perform much processing as a result of receiving the data of the injector.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A client data processing system for automatically communicating data from a client data processing system user of said client data processing system to a remote data processing system, said client data processing system comprising:

means for maintaining at said client data processing system a set of data instances potentially accepted by said remote data processing system wherein a data instance of said set of data instances includes a user configured data item and a user configured label that is assigned to said data item, wherein said set of data instances are configured and saved for future use through a user interface outside the context of any user interface presented to said client data processing system by said remote data processing system;

means for activating said set of data instances to be associated to a future user action;

means for presenting to said client data processing system user a prompt within the context of user interface presented by said remote data processing system for soliciting user response by said client data processing system user;

means for automatically communicating a subset of said set of data instances to said remote data processing system upon invocation of said user action by said client data processing system user in response to said prompt; and means for mapping information of said set of data instances to application data rules defined by said remote data processing system, said application data rules defining said subset that is acceptable to said remote data processing system, and wherein said application data rules includes a set of sought labels for data sought by said remote data processing system, wherein a sought label, of said set of sought labels, is used to match to user configured labels of said set of data instances.

2. The client data processing system of claim 1 wherein said data instance further includes a data type of said user configured data item.

3. The client data processing system of claim 1 wherein said application data rules includes a set of validity criteria for determining validity of user configured data items of said set of data instances that are acceptable by said remote data processing system.

4. The client data processing system of claim 1 further comprising means for managing a plurality of sets of data instances wherein said plurality of sets of data instances are associated to an authenticated user.

5. The client data processing system of claim 1 further comprising means for managing a plurality of sets of data instances wherein said plurality of sets of data instances are subordinate to groups defined by said client data processing system user.

6. The client data processing system of claim 1 further comprising means for prompting said user with a reconcilable indication of how said set of data instances map to said application data rules.

7. The client data processing system of claim 1 wherein said set of data instances has an expiration.

8. The client data processing system of claim 1 further comprising means for maintaining said set of data instances in a protected form from unauthorized access.

9. The client data processing system of claim 1 wherein said means for activating said set of data instances includes means for activating said set of data instances through user invocation of a hot-key.

10. The client data processing system of claim 1 further comprising means for supporting a user query of said prompt for providing information about said application data rules.

11. A method for automatically communicating data from a client data processing system user to a remote data processing system, said method comprising the steps of:

maintaining at said client data processing system a set of data instances potentially accepted by said remote data processing system wherein a data instance of said set of data instances includes a user configured data item and a user configured label that is assigned to said data item, wherein said set of data instances are configured and saved for future use through a user interface outside the context of any user interface presented to said client data processing system by said remote data processing system;

activating said set of data instances to be associated to a future user action;

presenting to said client data processing system user a prompt within the context of user interface presented by said remote data processing system for soliciting user response by said client data processing system user; and automatically communicating a subset of said set of data instances to said remote data processing system upon invocation of said user action by said client data processing system user in response to said prompt; and mapping information of said set of data instances to application data rules defined by said remote data processing system, said application data rules defining said subset that is acceptable to said remote data Processing system, and wherein said application data rules includes a set of sought labels for data sought by said remote data processing system, wherein a sought label, of said set of sought labels, is used to match to user configured labels of said set of data instances.

12. The method of claim 11 wherein said data instance further includes a data type of said user configured data item.

13. The method of claim 11 wherein said application data rules includes a set of validity criteria for determining validity of user configured data items of said set of data instances that are acceptable by said remote data processing system.

14. The method of claim 11 further including the step of performing customizable actions upon remote data processing system receipt of said subset, said customizable actions specified at said remote data processing system.

15. The method of claim 11 further including the step of enforcing protected usage of said prompt at said client data processing system, said protected usage defined by said remote data processing system.

16. The method of claim 11 wherein said prompt is defined in html of said user interface presented by said remote data processing system.

* * * * *

UNITED STATES PATENT AND TRADEMARK OFFICE
CERTIFICATE OF CORRECTION

PATENT NO. : 6,615,213 B1
DATED : September 2, 2003
INVENTOR(S) : William J. Johnson It is certified that error appears in the above-identified patent and that said Letters Patent is hereby corrected as shown below:

Column 3,
Line 66, substitute "arid" with -- and --.

Column 11,
Line 67, substitute "group;" with -- group --.

Column 22,
Lines 21 and 65, substitute "data," with -- data --.
Line 33, substitute "block:" with -- block --.

Column 26,
Line 20, substitute "user; and" with -- user --.
Line 29, substitute "Processing" with -- processing --.

Signed and Sealed this

Sixteenth Day of December, 2003

JAMES E. ROGAN
*Director of the United States Patent and Trademark Office*